US011895936B2

(12) United States Patent
Diaz Lankenau et al.

(10) Patent No.: US 11,895,936 B2
(45) Date of Patent: Feb. 13, 2024

(54) VEHICLE FOR CULTIVATION AND TRANSPORTATION

(71) Applicant: Massachusetts Institute of Technology, Cambridge, MA (US)

(72) Inventors: Guillermo Fabian Diaz Lankenau, Cambridge, MA (US); Amos Greene Winter, V, Somerville, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 140 days.

(21) Appl. No.: 17/605,822

(22) PCT Filed: Apr. 27, 2020

(86) PCT No.: PCT/US2020/030101
§ 371 (c)(1),
(2) Date: Oct. 22, 2021

(87) PCT Pub. No.: WO2020/220028
PCT Pub. Date: Oct. 29, 2020

(65) Prior Publication Data
US 2022/0225555 A1 Jul. 21, 2022

Related U.S. Application Data

(60) Provisional application No. 62/838,603, filed on Apr. 25, 2019.

(51) Int. Cl.
*A01B 51/02* (2006.01)
*A01B 63/104* (2006.01)
(Continued)

(52) U.S. Cl.
CPC .......... *A01B 51/026* (2013.01); *A01B 63/104* (2013.01); *A01B 63/106* (2013.01);
(Continued)

(58) Field of Classification Search
CPC ...... B62K 11/00; B62K 13/04; B62K 27/003; B62D 49/0628; B62D 49/0657;
(Continued)

(56) References Cited

U.S. PATENT DOCUMENTS 2,230,749 A 2/1941 Herbert
2,524,083 A 10/1950 Ronning
(Continued)

FOREIGN PATENT DOCUMENTS

CN 2072060 U * 4/1990
CN 2231641 Y * 7/1996
(Continued)

OTHER PUBLICATIONS

Dang, CN102308686,A Motorcycle Type Multifunctional Field Management Machine published Jan. 11, 2012 Original Document with English translation retrieved on May 31, 2023 (Year: 2012).*
(Continued)

*Primary Examiner* — Paul N Dickson
*Assistant Examiner* — Caitlin Anne Miller
(74) *Attorney, Agent, or Firm* — Barnes & Thornburg LLP

(57) ABSTRACT

Vehicles having the versatility to be used as farm vehicles while also being able to be used as a transportation method, such as a motorcycle, are provided. The vehicles can generally include a three-wheel configuration in which first and second drive wheels are substantially vertically aligned, and the third wheel is offset from the vertically aligned drive wheels. The third wheel can be aligned with the second wheel, or it can be disposed at a location that is between the first and second wheels while still being offset from the vertical alignment. A tool for performing farming actions is also provided. In some instances the tool can be laterally offset from the vertically aligned wheels, located between
(Continued)

the drive wheels, while in other instances the tool can be disposed distal of the rear wheel. Many vehicle and tool configurations are disclosed, as are methods for operating the same.

28 Claims, 11 Drawing Sheets

(51) Int. Cl.
    *A01B 63/106*     (2006.01)
    *B62K 11/00*     (2006.01)
    *B62D 49/06*     (2006.01)
    *B62D 61/08*     (2006.01)
    *B62K 13/04*     (2006.01)

(52) U.S. Cl.
    CPC .......... *B62K 11/00* (2013.01); *B62D 49/0628* (2013.01); *B62D 49/0657* (2013.01); *B62D 61/08* (2013.01); *B62K 13/04* (2013.01)

(58) Field of Classification Search
    CPC ...... B62D 61/08; B62D 49/0671; B62M 7/00; B62H 1/12; B62H 1/02; A01B 51/026; A01B 63/104; A01B 63/106
    USPC ......................................................... 180/210
    See application file for complete search history.

(56) References Cited

U.S. PATENT DOCUMENTS

| | | | |
|---|---|---|---|
| 3,040,510 | A | 6/1962 | Van Der Lely |
| 3,085,644 | A | 4/1963 | Van Der Lely |
| 3,298,453 | A | 1/1967 | Bobard |
| 4,690,235 | A | 9/1987 | Miyakoshi |
| 6,854,404 | B2 | 2/2005 | Jagani |

FOREIGN PATENT DOCUMENTS

| | | | | |
|---|---|---|---|---|
| CN | 2287364 | Y | | 8/1998 |
| CN | 2410166 | Y | | 12/2000 |
| CN | 201078898 | Y | * | 7/2008 |
| CN | 201115390 | Y | * | 9/2008 |
| CN | 102308686 | A | * | 1/2012 |
| CN | 203467498 | U | | 3/2014 |
| CN | 104137674 | A | | 11/2014 |
| CN | 203996651 | U | | 12/2014 |
| CN | 103858537 | B | | 11/2015 |
| CN | 105874943 | A | | 8/2016 |
| DE | 927420 | C | | 5/1955 |
| DE | 19820838 | A1 | * | 11/1999 ........... A01B 51/026 |
| EP | 2952422 | A1 | * | 12/2015 ............. A01C 15/00 |
| KR | 101915091 | B1 | * | 11/2018 |

OTHER PUBLICATIONS

Schiller DE19820838 Soil Cultivator for a Nursery That Can Be Driven Like Motorcycle published 1999, Original Document with English translation retrieved on May 31, 2023 (Year: 1999).*
Guiling CN 2072060 Machine Three Wheel Motorcycle, published 1991, Original Document with English translation retrieved on May 31, 2023 (Year: 1991).*
Kim KR 10191509, Landing Apparatus for Motor Cycle, published 2018, Original Document with English translation retrieved on May 31, 2023 (Year: 2018).*
Abubakar, M. S., Ahmad, D., and Akande, F. B., 2010. "A review of farm tractor overturning accidents and safety". Petranika Journal of Science and Technology.
Antille, D. L., Bennett, J. M., and Jensen, T. A., 2016. "Soil compaction and controlled traffic considerations in australian cotton-farming systems". Crop and Pasture Sci-ence.
Arelekatti, V. N. M., Bjorkdal, D. H., Graves, C. W., Wong, A., Mkrtchyan, A., and V. A. G. W., 2014. "Proof-of-concept evaluation of a low-cost and low-weight tractor for small-scale farms". In ASME ID ETC 2014.
Battiato, A., Diserens, E., and Sartori, L., 2013. "Traction performance simulation for mechanical front wheel drive tractors: towards a practical computer tool". Journal of Agricultural Engineering.
Battiato, A., and Diserens, E., 2013. "Influence of tyre in-flation pressure and wheel load on the traction performance of a 65 kw mfwd tractor on a cohesive soil". Journal of Agricultural Science.
Bekker, M. G., 1956. Theory of Land Locomotion. Univer-sity of Michigan Press.
Black Boar, 2019. S-tine cultivator. https://blackboaratv.com/products/s-tine-cultivator.
Briggs& Stratton, 2019. Cr 950 engine. https://www.briggsandstratton.com/na/en us/product-catalog/engines/utility-engines/cr950-series.html.
Cassidy, W., 2017. "Tractor tire and ballast management". University Extension, University of Missouri Columbia.
Chamen, T., 2014. "Controlled traffic farming—from worldwide research to adoption in Europe and its future prospects". In International Conference of Agricultural Engineering.
de Souza, G. S., de Souza, Z. M., da Silva, R. B., Barbosa,R. S., and Araùjo, F. S., 2014. "Effects of traffic control on the soil physical quality and the cultivation of sugarcane". Revista Brasileira de Ciência do Solo.
Dejong-Hughes, J., 2017. "Tires, traction and compaction". University of Minnesota Extension. Extension UMN web-site.
Demsar, I., Bernik, R., and Duhovnik, J. "A math-matical model and numerical simulation of the static stability of a tractor". Agric. conspec. sci. vol. 77 (2012) No. 3.
Department of Agriculture, Cooperation and Farmer Welfare, 2019. "Annual report 2017 to 2018". Govern-ment of India Ministry of Agriculture Farmers Welfare.
Digital Commons at Nebraska University—Lincoln (https://digitalcommons.unl.edu/tractormuseumlit/).
FAO (Food and Agricultural Organization), 1965. "Fao, the first 40 years: 1945-1985".
FAO (Food and Agricultural Organization), 2013. "Mechanization for rural development: A review of patterns and progress from around the world". Integrated Crop Management.
Food, Advisory, A. S., Research (FASAR), Y. B., and at OAV German Asia-Pacific Business Associa-tion (GAA), G. A. A., 2016. "Farm mechanization in india. the custom hiring perspective". Indian Ministry of Agriculture and Farmers Welfare.
Foster, A., et al., 2010. "Barriers to farm profitability in india: Mechanization, scale and credit markets.". World Bank Resources.
Ghotbi, B., et al., "Effect of multi-pass on the mobility of wheeled robots on soft terrain". In ECCOMAS Thematic Confer-ence on Multibody Dynamics. (2015).
Haacon Lifting Technology, 2019. Company website with details on products. https://www.haacon.com/en/products/commercial-vehicle-equipment/rack-and-pinion-jacks/.
Holm, I., 1969. "Multi-pass behaviour of pneumatic tires". Journal of Terramechanics, pp. 47-71.
International Search Report and Written Opinion issued for PCT/US2020/030101, dated Jul. 6, 2020.
Kolpin Outdoors, 2019. Atv utv dirtworks tool attachment—disc plow kit. https://www.kolpin.com/disc-plow.
Lankenau, et al., "Design of a Specialized Tractor to Replace Draft Animals in Small Farms," ASME 2019 International Design Engineering Technical Conferences & Computers and Information in Engineering Conference, Aug. 2019.
Lankenau et al., "Investigation of viability to replace draft animals with all-wheel-drive motorcycles on small Indian farms."
Lankenau et al., 2018. "An engineering review of the farm tractor's evolution to a dominant design". ASME Journal of Mechanical Design. doi:10.1115/DETC2018-86285.
Lankenau, et al., "Design of a human-powered roll stabilization attachment for utilitarian two-wheeled vehicles". ASME IDETC. Anaheim, CA. (2019).
Lowder, S., Skoet, J., and Singh, S., 2014. "What do we really know about the number and distribution of family farms worldwide?

(56) References Cited

OTHER PUBLICATIONS background paper for the state of food and agriculture". ESA Working Paper No. 14-02. RomeFAO.

MacDonald, J. et al., "Farm size and the organization of u.s. crop farming". USDA Economic Research Report—152. (2013).

Mahindra New Model 21S Yuvraj NXT Tractor Price List Spec Features, Mahindra Tractors, 2017, <tractorsinfo.com/mahindra-new-model-215-yuvraj-nxt-tractor-proce-list-specification-and-features/>.

Mahindra Tractors, 2019. Company website with details on vehicles. https://www.mahindratractor.com.

Marshaus, S., 2015. "Dominant design: How the Ferguson system revolutionized mechanized agriculture". Master's thesis, University of Winsonsin—Eau Claire, History Department.

Mehta, C., Chandel, N., Senthikumar, T., and Singh, K. K., 2014. "Trends of agricultural mechanization in India" CSAM Policy Brief.

Northern Tool, 2019. Field tuff tow-behind tiller—36in. width, model No. atv-3665. https://www.northerntool.com/products/field-tuff-tow-behind-tiller-36in-width-model-atv-3665-41966.

Northern Tool, 2019. Field tuff 3-pt. hobby seed planter—0.22 bushel capacity, model No. ftf-cbp3pt. https://www.northerntool.com/products/field-tuff-3-pt-hobby-seed-planter-0-22-bushel-capacity-model-ftf-cbp3pt-41732.

NSL Srivastava, 2006. "Farm power sources, their availability and future requirements to sustain agricultural production". Indian Council of Agricultural Research.

Olmstead, A. L., and Rhode, P. W., 2001. "Reshaping the landscape: The impact and diffusion of the tractor in amer-ican agriculture, 1910-1960". The Journal of Economic History, pp. 663-698.

Onal, I., 2012. "Controlled traffic and widespan tractors". Tarim Makinalari Bilimi Dergisi (Journal of Agricultural Machinery Science).

Prabu M J, 2010. "A tilting cart offers relief to animals and workers in the field.". The Hindu, Apr. www.thehindu.com/sci-tech/agriculture/A-tilting-cart-offers-relief-to-animals-and-workers-in-the-field/article16371609.ece.

Rokon Scout Motorcycle, <https://www.rokon.com/product/scout/>.

Rokon International Inc., 2019. Company website with details on vehicles. https://www.rokon.com/.

Senatore, C., 2010. "Prediction of mobility, handling, and tractive efficiency of wheeled off-road vehicles". PhD dis-sertation, Virginia Polytechnic Institute and State Univer-sity, Department of Mechanical Engineering.

Smith and Grisso, "Using Tillage Horsepower More Efficiently: Selecting Speed, Slip and Ballast." Conservation Tillage Proceeding 9:79-81. 1990.

Smith, D. W. "Safe tractor operation: Rollover prevention". Texas Agricultural and Mechanical University. AgriLife Extension. 2005.

USDA, E. R. S., 2005. "U.S. farms: Numbers, size, and ownership". Structure and Finances of U.S. Farms: 2005 Family Farm Report EIB-12.

Valera, D. L., Gil. J., and Agäera, J., 2012. "Design of a new sensor for determination of the effects of tractor field usage in southern spain: Soil sinkage and alterations in the cone index and dry bulk density". Sensors.

Vevor Machinery Equipment, 2019. Company home-page. http://www.vevor.com.

Watson, P. R., 1981. "Animal traction". Peace Corps. by TransCentury Corporation.

White, W. J., 2017. "Economic history of tractors in the united states". Economic History Association. Website.

Williams, R. C., 1987. Fordson, Farmall, and Poppin' Johnny: A History of the Farm Tractor and its Impact on America. Champaign: University of Illinois Press, Urbana, Illinois.

Wong et al., 1967. "Prediction of rigid wheel performance based on the analysis of soil-wheel stresses part i. performance of driven rigid wheels". Journal of Terramechanics, pp. 81-98.

Wong, J., 2010. Terramechanics and Off-Road Vehicle Engineering. Elsevier, Oxford, UK.

Zoz, F. M., and Grisso, R. D., 2003. "Traction and tractor performance". In Agricultural Equipment Technology Conference, pp. 1-47.

Farm Show, vol. 34, No. 4; www.farmshow.com.

Goe, M. R., and McDowell, R. E., 1980. "Animal traction guidelines for utilization". Cornell International Agriculture Mimeograph.

Singh, T. P., 2016, "Farm Machinery," PHI Learning Pvt. Ltd. (pp. 1-57 and 144-172).

* cited by examiner

VEHICLE FOR CULTIVATION AND TRANSPORTATION

CROSS REFERENCE TO RELATED APPLICATION

The present application claims priority to and the benefit of U.S. Provisional Patent Application No. 62/838,603 filed Apr. 25, 2019, and titled "Vehicle for Cultivation and Transportation," the contents of which is incorporated here by reference in its entirety.

FIELD

The present disclosure relates to a vehicle for use in cultivation, and more particularly relates to a vehicle having particular benefits for farmers and the like who need a vehicle that can double as both a vehicle to be utilized in farming and a vehicle to be utilized as a method of transportation.

BACKGROUND

A tractor designed specifically to meet the needs of small farmers in India, who would otherwise use draft animals, has the potential to create significant impact by improving farmers' economic health and India's overall food production capacity. Small farms (approximately less than 2 hectares (ha)) are common in India, where the average farm size has steadily decreased from approximately 2.28 ha in 1971 to approximately 1.08 ha in 2016. Globally, approximately 84% of farms are less than 2 ha in size. Most small farmers use a pair of bovine draft animals known as bullocks (sometimes called oxen in other countries) for all or most of their farming operations, supplemented by manual labor or a hired tractor. Bullocks are compact, highly maneuverable, and have a low capital cost, making them well-suited to the technical and economic constraints of small farms.

Conventional tractors, which are an icon of modern farming, are able to produce much higher farm yields than bullocks. Farm tractors increase the capacity of each agricultural worker and enable larger, more profitable farms. The Indian Agricultural Ministry estimates that farm tractors increase farm yields approximately in the range of about 5% to about 20%, reduce wasted seeds and fertilizer approximately in the range of about 15% to about 20%, and reduce farm labor approximately in the range of about 20% to about 30%. However, tractors have not yet been able to replace key bullock features of maneuverability and compactness that are essential to work on smaller firms, like those prevalent in India and globally. Tractors also have a high upfront cost that puts them out of reach of many small farmers in low income regions. As a result, small-scale farmers are constrained to the slow speed of bullocks and a lack of access to suitable modern, more effective made-for-tractor tools.

Research has shown that farmers of smaller farms use bullocks both because of their low capital cost and their suitability to the narrow inter-row spaces typically used on smaller farms. Bullocks have a smaller width than tractors and are more maneuverable. These characteristics allow bullocks to walk between rows of growing crops later into the season when crops are taller and wider, leaving less space between crop rows. Compared to tractors, bullocks require less space to turn at row ends, and can better traverse unfinished dirt paths leading to farm fields. These critical features of low upfront cost and ability to access narrow spaces are generally not present in commercially available small tractors. The few tractors that approach the purchase price of bullocks cannot match the bullock's maximum pulling force, a key requirement for seamlessly replacing them.

In conventional tractors, lower cost often comes at the expense of pulling force. Pulling force is related to a mass of a tractor, which is correlated to purchase price. To be sold for a price comparable to bullocks (approximately 100,000 Indian rupees, which converts to approximately $1300 U.S. dollars as of April 2020), a tractor would likely have a mass approximately in the range of about 350 kilograms to about 500 kilograms given the current trends of the Indian tractor market. The layout of a conventional, rear-wheel drive tractor with a mass approximately in the range of about 350 kilograms to about 500 kilograms would only produce a maximum pulling force of approximately 60% of its weight in near ideal tilling conditions, approximately in the range of about 2060 Newtons to about 2940 Newtons, and closer to approximately 35% of its weight in soft soil conditions, approximately in the range of about 1200 Newtons to about 1720 Newtons. This could not, under most conditions, match the maximum pulling force of a bullock pair, which is approximately 2800 Newtons.

A lightweight tractor capable of replacing bullocks in small forms, and thereby improving the livelihood of farmers, must approximately match or exceed each of: a pulling force of bullocks currently used; a purchase price for such bullocks; and their ability to enter narrow spaces. The lightest tractors currently available to farmers have limited pulling force, approximately in the range of about 1720 Newtons to about 2940 Newtons, depending on soil conditions and actual mass, and are unable to access narrow inter-row spaces. Even then, such vehicles are made by small-volume local manufacturers near smallholder farms and are not widely distributed.

Accordingly, there is a need to develop vehicles capable of matching or exceeding the pulling force of bullocks used for farming while still have similar maneuverability as such bullocks. The vehicles should preferably be affordable for owners of small farms even in developing countries. Further, additional benefits can be realized if the vehicles are adaptable such that they can be used for farming and transportation, and when used for framing, used to perform a variety of different farming tasks (e.g., tilling, plowing, planting, cultivating, spraying, etc.).

SUMMARY

The present application is directed to a vehicle that has been designed for use by farmers who do not necessarily need a conventional tractor to perform farming tasks, but rather would benefit from a vehicle that can be used in farming and as a method of transportation. It provides a cheaper alternative to traditional farming equipment, and provides versatility not typically found in farming equipment by allowing the vehicle to be used as a typical transportation means (e.g., motorcycle). There are a number of different features provided for by the disclosed vehicle that allow it to be practical and affordable, particularly for owners or administrators of smaller farms.

One aspect of the designs of the vehicle provided for herein is the orientation of the wheels with respect to the tool (e.g., a cultivation tool, such as for tilling soil). Two wheels can be in a vertical alignment, similar to a motorcycle or bicycle configuration, while a third wheel can be offset from the vertical alignment, and behind the front wheel of the two wheels. This third wheel can be horizontally aligned with the back wheel of the two wheels (i.e., similar to the way the two back wheels of a car are horizontally aligned), or it can be disposed somewhere between the front and back wheels such that none of the three wheels are horizontally aligned. The tool can similarly be offset from the vertical alignment of the two wheels identified as the front and back wheels. In some embodiments, the tool can be located behind the front wheel and in front of the back wheel. For example, the tool can be disposed between the vertical alignment axis of the front and back wheels and a similarly parallel axis defined by the location of the third wheel, at a location that is behind the front wheel and in front of the back wheel. The tool can be positioned in a manner that allows it to be easily seen by the operator of the vehicle. In some other embodiments, the tool can be located behind the back wheel. Still further, whether between the front and back wheel, or behind the back wheel, the tool can be configured in a manner such that it can be moved to either side of the vertical alignment axis, or even in-line with the vertical alignment axis. Such movement can be driven by gears and other mechanical and/or electrical components of the vehicle, before or during operation of the vehicle, and/or can be done manually.

The third wheel can be associated with the vehicle by way of an outrigger arm, which can allow the third wheel to be selectively moved between various configurations. For example the third wheel can be moved between a configuration in which the third wheel is in contact with the ground and helps provide stability for the vehicle as it is used for farming purposes, and a configuration in which the third wheel is stowed, or altogether removed, from the vehicle as it is used for transportation purposes (e.g., driving in city streets). Other possible configurations in include, but are not limited to, configurations in which the third wheel is disposed above, but off, the ground, and allowing the wheel to be on either side of the vertical alignment axis. The outrigger arm itself can have a variety of configurations, such as a straight arm that is substantially parallel to the ground, or an arched configuration, allowing crops to more easily pass underneath the arm during use. Other configurations of outrigger arms are possible, including but not limited to the outrigger arm being able to be raised, lowered, or rotated with respect to the vehicle, folded, and/or detached from the vehicle.

The ability to easily and seamlessly transition from a farming vehicle to a vehicle used for everyday transportation is another particularly useful feature of the present disclosure. The fact that the vehicle is powered, by way of a motor, allows for convenient operation in both a farming context and transportation context. Further, the ability to include a cultivation tool (e.g., a tillage tool) as part of a vehicle that can also be used as a general mode of transportation provides versatility.

The tool itself, in the context of being used in conjunction with the vehicle designs provided for herein, is another feature of the present disclosure. The tool can be configured to be driven downwards by an active force, into the ground over which the vehicle is traveling, such that the tool applies force to, and enters into, the ground. Prior to the present disclosures, a tool in an offset location as described would be difficult to operate in a manner that would allow it to be driven downwards to apply force to, and enter into, the ground. A person skilled in the art, in view of the present disclosures, will understand a variety of other tools that can be incorporated into the various designs provided for herein, including but not limited to other tools typically used in farming, or more generally for treating the ground. Still further, the present disclosures are not limited to the tool being used for farming. Other types of tools may be incorporated into the vehicle design to allow the vehicle to have dual purposes in contexts beyond farming.

In one exemplary embodiment, a vehicle includes a chassis having a length defined by a front-most end and a back-most end, three wheels, an outrigger arm, a tool, and a motor. A first wheel of the three wheels is disposed below the chassis, and a second wheel of the three wheels is disposed behind the first wheel such that the first and second wheels are vertically aligned along a longitudinal axis that extends the length of the chassis. The third wheel of the three wheels is laterally offset from the longitudinal axis extending the length of the chassis, with a center of the third wheel being disposed behind a center of the first wheel and one of in front of or axially aligned with a center of the second wheel from a side view of the vehicle. The outrigger arm is disposed between and coupled to the third wheel and at least one of the chassis and the second wheel. The tool is configured to perform a farming operation and is coupled to the chassis and/or the outrigger arm. The motor is disposed behind the first wheel and is configured to drive at least one of the first and second wheels.

In some embodiments, the second and third wheels can be axially aligned such that the center of the second wheel and the center of the third wheel are disposed along an alignment axis. The alignment axis can be substantially perpendicular to the longitudinal axis that extends the length of the chassis.

The outrigger arm can be manipulable to allow the third wheel to be stored on the vehicle such that the vehicle can be driven with just the first wheel and the second wheel in contact with the ground. In some instances, the outrigger arm can have a storage position in which the third wheel is a distance above the ground that is equivalent to at least a radius of the first wheel, with each of the first and second wheels being in contact with the ground when the third wheel is in the storage position and the vehicle is being driven.

The motor can be configured to drive any combination of the three wheels (or more wheels if more than three wheels are used) in conjunction with at least one of the first and second wheels. For example, the motor can be configured to drive both the first wheel and the second wheel (i.e., it can have front and back wheel drive). Alternatively, or additionally, the motor can be configured to drive the third wheel in addition to at least one of the first and second wheels. The motor can be configured to mechanically drive at least one of the first and second wheels. In some embodiments, the motor can be configured to have a frequency of rotation held steady over a desired period of time. In some such embodiments, the motor can be configured to provide power take-off to the vehicle, and a rotation speed of the power take-off can be coupled to the frequency of rotation of the motor.

As indicated above, in some embodiments, the motor can be configured to provide power take-off to the vehicle. In some such embodiments, the vehicle can include a front axle that is associated with the first wheel and a rear axle associated with the second wheel, and the power take-off can be located between the front and rear axles. The power take-off can be configured to rotate substantially perpendicularly to a centerline of the vehicle (which can include the longitudinal axis extending the length of the chassis). In some other embodiments in which the vehicle is configured to provide power take-off to the vehicle, the vehicle can include a rear axle associated with the second wheel, and the power take-off can be located behind the rear axle. The power take-off can be configured to be substantially parallel to a centerline of the vehicle (which can include the longitudinal axis extending the length of the chassis).

In some embodiments, the tool can be disposed behind the first wheel, in front of the second wheel, and can be offset from the longitudinal axis that extends the length of the chassis. In some other embodiments, the tool can be disposed behind the second wheel. In some such instances the tool can be offset from the longitudinal axis that extends the length of the chassis, while in other such instances the tool can be substantially aligned with the longitudinal axis that extends the length of the chassis. The tool can be configured to be driven downwards by an active force, into ground over which the vehicle is traveling, such that the tool applies force to, and enters into, the ground. The active force can be supplied, for example, by an operator of the vehicle, either directly or indirectly. A non-limiting example of a direct supply of the active force is an operator taking an action, such as turning a knob, that causes a linkage or the like, to drive the tool downwards. A non-limiting example of an indirect supply of the active force is an operator taking an action, such as pushing a button, that causes the motor, or a separate motor, to in turn apply a force to a linkage or the like to drive the tool downwards. A person skilled in the art, in view of the present disclosures, will understand many ways by which the tool(s) can be operated in conjunction with operating the vehicle without departing from the spirit of the present disclosure.

The applied force by the tool can be a substantially horizontal force that can cultivate the ground. The tool can be further configured to apply a second active force to the vehicle, which can cause the vehicle to be pulled towards the ground while a position of the tool with respect to the ground remains substantially constant. The tool can be visible to an operator of the vehicle such that the operator is able to control operation of the tool based on visual observations of the tool. In some embodiments, the tool can be movable laterally with respect to the longitudinal axis that extends the length of the chassis such that a distance between the tool and the chassis is adjustable while the vehicle is being operated to perform a farming operation.

In another exemplary embodiment, a vehicle includes a chassis having a length defined by a front-most end and a back-most end, three wheels, an outrigger arm, a cultivation tool, and a motor. A first wheel of the three wheels is disposed below the chassis, and a second wheel of the three wheels is disposed behind the first wheel such that the first and second wheels are vertically aligned along a longitudinal axis extending the length of the chassis. The third wheel of the three wheels is also disposed behind the first wheel, with the third wheel being disposed offset from the longitudinal axis extending from the length of the chassis. The outrigger arm is disposed between and coupled to the third wheel and at least one of the chassis and the second wheel. The cultivation tool is disposed behind the first wheel, in front of the second wheel, and is disposed offset from the longitudinal axis that extends the length of the chassis. The cultivation tool is at a location closer to the longitudinal axis than the third wheel is located with respect to the longitudinal axis. The motor is disposed behind the first wheel and is configured to power at least one of the first and second wheels.

In some embodiments, the second and third wheels can be axially aligned such that a center of the second wheel and a center of the third wheel are disposed along an alignment axis. The alignment axis can be substantially perpendicular to the longitudinal axis that extends the length of the chassis.

The outrigger arm can be manipulable to allow the third wheel to be stored on the vehicle such that the vehicle can be driven with just the first wheel and the second wheel in contact with the ground. In some instances, the outrigger arm can have a storage position in which the third wheel is a distance above the ground that is equivalent to at least a radius of the first wheel, with each of the first and second wheels being in contact with the ground when the third wheel is in the storage position and the vehicle is being driven.

The motor can be configured to drive any combination of the three wheels (or more wheels if more than three wheels are used) in conjunction with at least one of the first and second wheels. For example, the motor can be configured to drive both the first wheel and the second wheel (i.e., it can have front and back wheel drive). Alternatively, or additionally, the motor can be configured to drive the third wheel in addition to at least one of the first and second wheels. The motor can be configured to mechanically drive at least one of the first and second wheels. In some embodiments, the motor can be configured to have a frequency of rotation held steady over a desired period of time. In some such embodiments, the motor can be configured to provide power take-off to the vehicle, and a rotation speed of the power take-off can be coupled to the frequency of rotation of the motor.

As indicated above, in some embodiments, the motor can be configured to provide power take-off to the vehicle. In some such embodiments, the vehicle can include a front axle that is associated with the first wheel and a rear axle associated with the second wheel, and the power take-off can be located between the front and rear axles. The power take-off can be configured to rotate substantially perpendicularly to a centerline of the vehicle (which can include the longitudinal axis extending the length of the chassis). In some other embodiments in which the vehicle is configured to provide power take-off to the vehicle, the vehicle can include a rear axle associated with the second wheel, and the power take-off can be located behind the rear axle. The power take-off can be configured to be substantially parallel to a centerline of the vehicle (which can include the longitudinal axis extending the length of the chassis).

The cultivation tool can be a tillage tool, for example. Many other cultivation tools can be used in lieu of, in conjunction with, and/or in addition to a tillage tool. The cultivation tool can be configured to be driven downwards by an active force, into ground over which the vehicle is traveling, such that the cultivation tool applies force to, and enters into, the ground. The active force can be supplied, for example, by an operator of the vehicle, either directly or indirectly. A non-limiting example of a direct supply of the active force is an operator taking an action, such as turning a knob, that causes a linkage or the like, to drive the tool downwards. A non-limiting example of an indirect supply of the active force is an operator taking an action, such as pushing a button, that causes the motor, or a separate motor, to in turn apply a force to a linkage or the like to drive the tool downwards. A person skilled in the art, in view of the present disclosures, will understand many ways by which the tool(s) can be operated in conjunction with operating the vehicle without departing from the spirit of the present disclosure.

The applied force by the cultivation tool can be a substantially horizontal force, which can cultivate the ground. The tool can be further configured to apply a second active force to the vehicle, which can cause the vehicle to be pulled towards the ground while a position of the tool with respect to the ground remains substantially constant. The tool can be visible to an operator of the vehicle such that the operator is able to control operation of the tool based on visual observations of the tool. In some embodiments, the cultivation tool can be movable laterally with respect to the longitudinal axis that extends the length of the chassis such that a distance between the cultivation tool and the chassis is adjustable while the vehicle and the cultivation tool are being operated.

In still another exemplary embodiment, a vehicle includes a chassis having a length defined by a front-most end and a back-most end, three wheels, an outrigger arm, a tool, and a motor. A first wheel of the three wheels is disposed below the chassis, and a second wheel of the three wheels is disposed behind the first wheel such that the first and second wheels are vertically aligned along a longitudinal axis extending the length of the chassis. The third wheel of the three wheels is also disposed behind the first wheel, with the third wheel being disposed offset from the longitudinal axis extending from the length of the chassis. The outrigger arm is disposed between and coupled to the third wheel and at least one of the chassis and the second wheel. The tool is disposed behind the first wheel, in front of the second wheel, and is offset from the longitudinal axis that extends the length of the chassis. The tools is configured to be driven downwards by an active force, into ground over which the vehicle is traveling, such that the tool applies force to, and enters into, the ground. The motor is disposed behind the first wheel and is configured to drive at least one of the first and second wheels.

In some embodiments, the second and third wheels can be axially aligned such that a center of the second wheel and a center of the third wheel are disposed along an alignment axis. The alignment axis can be substantially perpendicular to the longitudinal axis that extends the length of the chassis.

The outrigger arm can be manipulable to allow the third wheel to be stored on the vehicle such that the vehicle can be driven with just the first wheel and the second wheel in contact with the ground. In some instances, the outrigger arm can have a storage position in which the third wheel is a distance above the ground that is equivalent to at least a radius of the first wheel, with each of the first and second wheels being in contact with the ground when the third wheel is in the storage position and the vehicle is being driven.

The motor can be configured to drive any combination of the three wheels (or more wheels if more than three wheels are used) in conjunction with at least one of the first and second wheels. For example, the motor can be configured to drive both the first wheel and the second wheel (i.e., it can have front and back wheel drive). Alternatively, or additionally, the motor can be configured to drive the third wheel in addition to at least one of the first and second wheels. The motor can be configured to mechanically drive at least one of the first and second wheels. In some embodiments, the motor can be configured to have a frequency of rotation held steady over a desired period of time. In some such embodiments, the motor can be configured to provide power take-off to the vehicle, and a rotation speed of the power take-off can be coupled to the frequency of rotation of the motor.

As indicated above, in some embodiments, the motor can be configured to provide power take-off to the vehicle. In some such embodiments, the vehicle can include a front axle that is associated with the first wheel and a rear axle associated with the second wheel, and the power take-off can be located between the front and rear axles. The power take-off can be configured to rotate substantially perpendicularly to a centerline of the vehicle (which can include the longitudinal axis extending the length of the chassis). In some other embodiments in which the vehicle is configured to provide power take-off to the vehicle, the vehicle can include a rear axle associated with the second wheel, and the power take-off can be located behind the rear axle. The power take-off can be configured to be substantially parallel to a centerline of the vehicle (which can include the longitudinal axis extending the length of the chassis).

The active force that drives the tool downwards can be supplied, for example, by an operator of the vehicle, either directly or indirectly. A non-limiting example of a direct supply of the active force is an operator taking an action, such as turning a knob, that causes a linkage or the like, to drive the tool downwards. A non-limiting example of an indirect supply of the active force is an operator taking an action, such as pushing a button, that causes the motor, or a separate motor, to in turn apply a force to a linkage or the like to drive the tool downwards. A person skilled in the art, in view of the present disclosures, will understand many ways by which the tool(s) can be operated in conjunction with operating the vehicle without departing from the spirit of the present disclosure.

The applied force by the tool can be a substantially horizontal force that can cultivate the ground. The tool can be further configured to apply a second active force to the vehicle, which can cause the vehicle to be pulled towards the ground while a position of the tool with respect to the ground remains substantially constant. The tool can be visible to an operator of the vehicle such that the operator is able to control operation of the tool based on visual observations of the tool. In some embodiments, the tool can be movable laterally with respect to the longitudinal axis that extends the length of the chassis such that a distance between the tool and the chassis is adjustable while the vehicle and the tool are being operated.

BRIEF DESCRIPTION OF DRAWINGS

This disclosure will be more fully understood from the following detailed description taken in conjunction with the accompanying drawings, in which.

DETAILED DESCRIPTION

Figure 1:
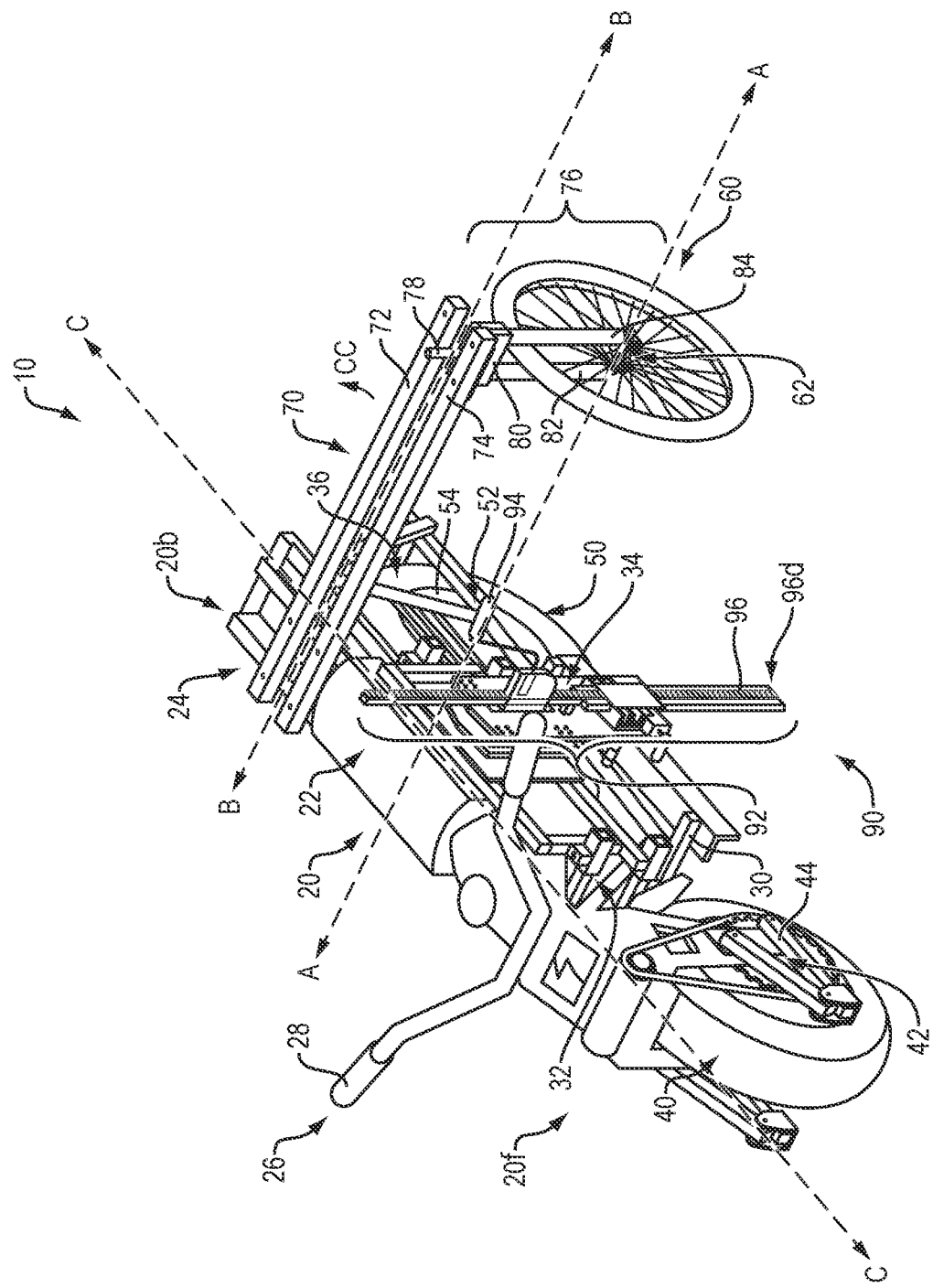
FIG. 1 is a perspective view of one exemplary embodiment of a vehicle.

Certain exemplary embodiments will now be described to provide an overall understanding of the principles of the structure, function, manufacture, and use of the devices and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present disclosure is defined solely by the claims. The features illustrated or described in connection with one exemplary embodiment may be combined with the features of other embodiments. Such modifications and variations are intended to be included within the scope of the present disclosure. As a result, to the extent one exemplary embodiment of a vehicle, or component(s) thereof, includes a particular feature(s), a person skilled in the art will be able to incorporate that feature into other vehicles, or components thereof, including various embodiments of vehicles and components provided for herein, as well as in other vehicles and components known to those skilled in the art.

In the present disclosure, like-numbered components of various embodiments generally have similar features when those components are of a similar nature and/or serve a similar purpose. To the extent terms such as front, forward, back, rear, behind, top, bottom, side, horizontal, vertical, etc. are used to describe a location of various components of the vehicles, such usage is by no means limiting, and is often used for convenience when describing various possible configurations. A person skilled in the art will be able to apply these configurations across a number of different vehicle set-ups. To the extent words are not entirely clear to establish the location of the components of a particular configuration, the figures and knowledge of one skilled in the art will be able to supplement such descriptions. To the extent features are described herein as being a "first feature" or a "second feature," such numerical ordering is generally arbitrary, and thus such numbering can be interchangeable.

Vehicle

The present disclosures generally illustrate vehicles having three wheels—two wheels that are vertically aligned such that a first, front wheel and a second, rear wheel are aligned along a longitudinal axis extending a length of a chassis of the vehicle, referred to herein as the chassis longitudinal axis, and a third wheel that is offset from the chassis longitudinal axis. The foregoing notwithstanding, vehicles having other numbers of wheels are also possible, including having four or more wheels. The vehicles also include a tool (e.g., a cultivation tool, such as a tillage tool) that can also be offset from the chassis longitudinal axis. In some instances, the location of the tool can be described as being biased, and in many instances this bias can be on a side opposite of a throttle grip control of the vehicle. The location of the throttle grip control of the vehicle can be similar to the location of a throttle grip control of a motorcycle. As described in greater detail below, while in many instances the tool can be offset from the chassis longitudinal axis, it does not have to be. It can also be aligned along the chassis longitudinal axis. In some embodiments, the tool can be moved between one or more offset locations and/or a location that is along the chassis longitudinal axis, such as before or during operation of the vehicle. Still further, in some instances, the tool can be disposed at a location along one or more longitudinal axes that extends substantially parallel to the chassis longitudinal axis (or along the chassis longitudinal axis itself when the tool is disposed on the cassis longitudinal axis) such that the tool is disposed behind the front wheel and in front of the rear wheel as taken on akin positions along the one or more longitudinal axes and the chassis longitudinal axis (or as both taken on the chassis longitudinal axis if the tool is disposed on the chassis longitudinal axis). In some other instances, the tool can be disposed behind the rear wheel as either taken on akin positions along the one or more longitudinal axes and the chassis longitudinal axis or as taken on the chassis longitudinal axis if the tool is disposed on the chassis longitudinal axis.

The third wheel can be connected to the vehicle by way of an outrigger arm. The outrigger arm can be disposed between the chassis and the third wheel, and in at least some instances can be disposed between the second and third wheels. It can be coupled to the third wheel, and in at least some instances, can also be coupled to the second wheel. The outrigger arm can help provide balance for the vehicle, for instance during a heavy tillage operation. The outrigger arm can have a wheel (e.g., the third wheel) disposed at one end, with the other end being connected to the chassis and/or the second wheel. The arm can be positioned above a rear wheel (e.g., the second wheel) axle and can extend substantially perpendicular to the longitudinal axis that extends the length of the chassis. In at least some instances, the longitudinal axis can be co-aligned with a centerline of the vehicle such that the outrigger arm extends substantially perpendicular to the centerline of the vehicle. The outrigger arm can extend away from the chassis in either direction, such as in the same direction or opposite directly the tool is located when the tool is in an offset location. A ground clearance of the outrigger arm can be such that it is at least greater than one diameter of the second, rear wheel. In some instances, the outrigger arm can be raised, lowered, or rotated with respect to the vehicle, folded, and/or detached from the vehicle. The outrigger arm itself can have a variety of configurations, such as a straight arm that is substantially parallel to the ground, or an arched configuration, allowing crops to more easily pass underneath the arm during use.

When the tool is not being operated, the third wheel and/or the outrigger can be stored or otherwise moved out of the way. The storage can occur directly on the vehicle itself, or the storage can result from removing the third wheel and/or the outrigger arm entirely from the vehicle for a period of time. The vehicle can allow the third wheel and/or the outrigger arm to be reconnected as desired. In instances in which the storage occurs on the vehicle itself, many different configurations for such storage are provided for herein and/or derivable from the present disclosures by a person skilled in the art. When the vehicle is being operated with third wheel and/or the outrigger in a storage position or configuration, it can operate in a manner similar to a conventional two-wheeled motorcycle. As a result, the storage position(s) for the outrigger arm and third wheel is such that a length of the vehicle and a center-of-mass location of the vehicle are not significantly altered. Further, when the outrigger arm and third wheel are in the storage position(s), the vehicle can still lean enough to contribute measurably to its maneuverability. For example, a roll rotation can generally be greater than five (5) degrees.

The vehicles disclosed herein can also be configured to include power take-off, and more specifically two power take-offs. More particularly, a motor of the vehicle can be configured to provide power take-off to the vehicle. The inclusion of power take-off can enhance the usability of the vehicle in farming and other situations. Typically farm tractors have one power take-off, which is located behind a rear axle. Such power take-offs provide a single degree of freedom that is rigid, rotating, splined, and spindled. The rotation axis of the power take-off is typically perpendicular to the rear axle.

The power take-off of provided for in the present disclosure, however, is enhanced because it includes a second power take-off. More specifically, the power take-off provided by the present disclosure is located longitudinally between both axles (front and rear), and is located about one wheel diameter above the ground. This second power take-off can have a rotation axis that is parallel to a nominal rear axle orientation. In other words, the second power take-off can extend sideways from the vehicle. The second power take-off can power handheld tools, for example, via a flexible cable shaft adapter and/or an electrical power adapter.

FIG. 1 illustrates one exemplary embodiment of a vehicle 10 that is configured to perform both farming functions and serve as transportation outside of the context of farming. The vehicle 10 can generally be described as a motorcycle having additional features, such as a third wheel and adaptability to include one or more tools commonly used in farming. In fact, while in some instances the vehicles described herein can be manufactured from scratch, in other instances, an existing motorcycle can be adapted to include features of the present disclosures, such as those features associated with the third wheel and/or farming tools. For example, at least some aspects of the present disclosure have been proven viable by modifying a ROKON® Scout® motorcycle (from Rokon International, Inc. of Rochester, NH) to include features described herein. Specifications related to the ROKON® Scout® motorcycle are available at https://www.rokon.com/bikes/scout, the contents of which is incorporated by referenced here in its entirety, and include a full-time drive system with front and rear wheel drive, a single cylinder, four stroke, fan cooled engine, piston displacement of about 208 cc, a power output of about 7 HP at 3600 RPM, a peak torque of about 12.4 (9.1) Nm (ft. lb.) at 2800 RPM, a speed range of approximately 0 MPH to about 35 MPH, a power take-off of about 7 HP speed proportional to throttle setting, an automatic torque converter into a three-gear range selector for power transmission, an electronic magneto ignition, approximately 12-inch steel spoke wheels, approximately 8×12×25 inch tubeless tires, a wheel base of approximately 51 inches, a ground clearance of about 13 inches, a height over seat of about 31 inches, a height over handlebar of about 39 inches, a width of about 30 niches, a length of about 79 inches, a weight of about 218 pounds (dry weight), and a fordable water depth of about 22 inches. Vehicles having features and sizes at or near the size of the ROKON® Scout® motorcycle are possible in view of this present disclosure, including vehicles that can have sizes up to approximately 100% smaller and approximately 500% larger than the sizes associated with the ROKON® Scout® motorcycle. At least because a person having skill in the art will appreciate various aspects and features of a motorcycle, components that are provided in the present disclosure and are also components typically found as part of a motorcycle are not necessarily identified and/or described herein for the sake of brevity.

Vehicles of the present disclosure may be referred to as a "bullkey." The bullkey name is a portmanteau of bullock and key, indicating the ability of the vehicle to unlock the bullock market to mechanization.

Chassis

A chassis 20 of the vehicle 10 can have a variety of configurations typical of most motorcycles. A length of the chassis 20 can be defined by a front-most end 20f to a back-most end 20b, also referred to as a frame length of the vehicle 10. The chassis 20 provides components to mount other components of the motorcycle, including but not limited to the wheels, the engine, and control elements, such as controls for the tools, third wheel, and outrigger arm. A seat 22 can be included on the chassis 20 on which an operator of the vehicle can sit. The seat 22 in the illustrated embodiment allows the operator to straddle the main vehicle with his or her legs and his or her center-of-mass can be approximately centered longitudinally and laterally between front and rear drive wheels 40, 50. A secondary seat or storage area 24 can be provided behind the seat 22, such second seat or storage area 24 being able to have a second person sit on it, have one or more data collection tools associated therewith (such as having a computer recording data related to the vehicle disposed thereon), have one or more tools associated with it (such as a farming tool, e.g., a sprayer), and/or receive one or more of a third wheel 60, an outrigger arm 70, and/or components associated therewith to store the same when the vehicle 10 is being operated in a transportation mode, as opposed to a farming mode. Alternatively, the vehicle 10 can have the ability to operate as an autonomous and/or remote-controlled vehicle such that an operator or person is not positioned on the vehicle. In such instances a seat may or may not be provided as part of the chassis. Providing a seat allows the vehicle the versatility to be used in user-riding and non-user-riding configuration, although in some instance where the vehicle is designed to be autonomous and/or remote-controlled, the design may be such that a user is not provided a convenient option for riding on the vehicle.

The chassis 20 can also include, or can have coupled thereto, vehicle controls. As shown, the vehicle controls include handlebars 26 for steering, hand-controlled throttles 28, and brakes (not visible). The handlebars 26, throttles 28, and brakes are similar to typical motorcycle-style controls, and thus a further explanation of the same is unnecessary. As shown, all drive controls can be on the handlebars 26, although they do not have to be. The chassis 20 can also include other features typically understood to be part of a chassis, some of which are illustrated, and others are known to those skilled in the art. By way of example, in the illustrated embodiment, a foot peg 30 is provided for the operator, the foot peg 30 being either part of the chassis or a feature coupled to the chassis.

First and Second Wheels

A first or front wheel 40 can be coupled to the chassis 20 using known techniques, such as a front axle 42 and related components. Further, one or more ballast mounts 44 can be associated with the first or front wheel. In the illustrated embodiment, a front ballast rack having ballast mounts 44 on opposed sides of the wheel 40 (only one is visible) is coupled to the chassis 20 and is configured to receive one or more ballasts. A second or rear wheel 50 can likewise be coupled to the chassis 20 using known techniques, such as a rear axle 52 and related components. One or more ballast mounts 54 can be associated with the second or rear wheel as well, and such ballast can, but do not have to, have a similar configuration as the front ballast rack. As shown, each of the front and rear wheels 40, 50 are disposed below the chassis 20, with the rear wheel 50 being located behind the front wheel 40, and the front and rear wheels 40, 50 being vertically aligned along a longitudinal axis C-C that extends the length of the chassis, referred to herein as the chassis longitudinal axis C-C. In at least some embodiments, the front and rear wheels 40, 50 can both be driven such that the vehicle 10 is a two-wheel drive system with inline drive wheels. In the illustrated embodiment the wheels 40, 50 are chain-driven, although other drive configurations are possible. The drive wheels 40, 50 can be approximately the same diameter (e.g., approximately in the range of about 0.30 meters to about 1 meter, and in some embodiments it can be about 0.64 meters) and width (e.g., approximately in the range of about 0.1 meters to about 0.4 meters, and in some embodiments it can be about 0.2 meters), and the weight distribution of the vehicle 10 can be approximately equally distributed amongst the two wheels 40, 50, although other weight distributions between the wheels 40, 50 is also possible. In the illustrated embodiment, the front-most and rear-most points of the vehicle 10 are the drive wheels 40, 50.

The traction force between the first and second wheels 40, 50 and the soil can impact the performance of the vehicle 10. Accordingly, a physics analysis of tire-soil interactions to calculate traction force H and bulldozing force B can provide insights to the beneficial configurations afforded by the disclosed configurations. The soil exerts a pressure on the tire (normal to the wheel perimeter) and a shear stress (tangent to wheel perimeter). All weight-bearing wheels generate a normal stress on the soil (i.e., flotation). Only braked or powered wheels generate significant shear stress on the soil (i.e., traction). The normal and shear stresses at the tire-soil interfaces can be calculated from the mechanical behavior of the soil.

To calculate the soil pressure p along the perimeter of the tire, Equation 1 can be applied:

$$p = (ck'_c + w\gamma_s k'_\phi)(z/w)^n, \quad (1)$$

where c is soil cohesion, $k_c'$ is the cohesion constant, w is tire width, $\gamma_s$ is the soil bulk density, $k'_\phi$ is the friction constant, z is the depth below the soil surface, and n is the depth exponent (an experimental value relating penetration depth to penetration resistance).

The soil shear stress s is a function of tire-soil pressure and soil properties, and can be scaled by deformation at the tire soil interface represented by the term $1-e^{-j(i)/k}$, and is illustrated by Equation 2:

$$s = (c + p \tan(\varphi))(1 - e^{1(j(i)/k)}), \quad (2)$$

where $\varphi$ is soil friction angle, k is shear modulus, and j(i) is the shear displacement at the tire-soil interface, which is a function of tire slip i. Tire slip i is defined as $$1 - \frac{S}{R}\omega,$$

where S is the forward speed of the vehicle, while R and $\omega$ respectively are the effective radius and the angular velocity of the wheel being evaluated for slip.

To calculate the total reaction forces on the tire when contacting soil, the shear and normal stresses can be integrated along the casing of the tire. If the deformed tire is assumed to take the shape of a tire 140 illustrated in FIG. 2A, it can be separated into three sections: a circular arc 141 at the front of the tire; a flat horizontal section 143 at the bottom of the tire (the depth at which the tire total pressure matches the soil pressure); and a circular arc 145 at the rear of the tire. Tire sinkage and deformation can therefore be defined by the angles $\theta_c$, $\theta_f$, and $\theta_r$ shown in FIG. 2A.

Each tire's vertical (flotation) force must satisfy Equation 3:

$$V = wR \int_{\theta_c}^{\theta_f} [p(\theta)\cos(\theta) + s(\theta, i)\sin(\theta)] d\theta + \\ w2RP_t \sin(\theta) + wR \int_{\theta_c}^{\theta_r} [p(\theta)\cos(\theta) - s(\theta, i)\sin(\theta)] d\theta \quad (3)$$

From this, the tire shape angles $\theta_c$, $\theta_f$, and $\theta_r$ can be determined. For example, they can be found computationally by allowing the tire to sink into the soil in small time steps until the vertical load of the tire matches the soil reaction V from Equation 3. All values can then be known to calculate from Equation 4 (provided below) an estimate of a horizontal traction force H that the tire generates at a given slip i. An accurate calculation of tire shape uses a feedback controller that regulates slip i, which is a function of applied wheel torque, to reduce the error between H and the required forward thrust from that wheel. After every controller adjustment of tire slip i (i.e., after every controller time step), tire shape angles ($\theta_c$, $\theta_f$, and $\theta_r$) can be recalculated until the tire shape changes between controller time steps asymptote near zero. Further information about ways by which the tire shape angles $\theta_c$, $\theta_f$, and $\theta_r$ can be solved can be found in "Prediction of mobility, handling, and tractive efficiency of wheeled off-road vehicles," of Senatore, C, a PhD dissertation from Virginia Polytechnic Institute and State University, Department of Mechanical Engineering, the contents of which is incorporated by reference herein in its entirety.

The traction force H can then be calculated using Equation 4:

$$H = wR \int_{\theta_c}^{\theta_f} [s(\theta, i)\cos(\theta)]d\theta + \quad (4)$$
$$w \int_0^{L(\theta_c, R)} s(\theta)dx + wR \int_{\theta_c}^{\theta_r} [p(\theta)\sin(\theta) + s(\theta, i)\cos(\theta)]d\theta]$$

And the bulldozing force B can be calculated using Equation 5:

$$B = wR \int_{\theta_c}^{\theta_f} [-p(z)\sin(\theta)]d\theta \quad (5)$$

In these expressions, w is tire width, R is tire radius, and L is the length of the deformed flat section of the tire.

The drawbar pull, or force, from a single tire is the difference between its traction force H and its bulldozing force B. This force can also be referred to as a lateral force. The drawbar pull of the vehicle is the sum of the drawbar pull from all of its tires. For a vehicle with n number of tires, this is shown in Equation 6:

$$F = \sum_{v=1}^{n} (H_v - B_v). \quad (6)$$

Figure 2A:
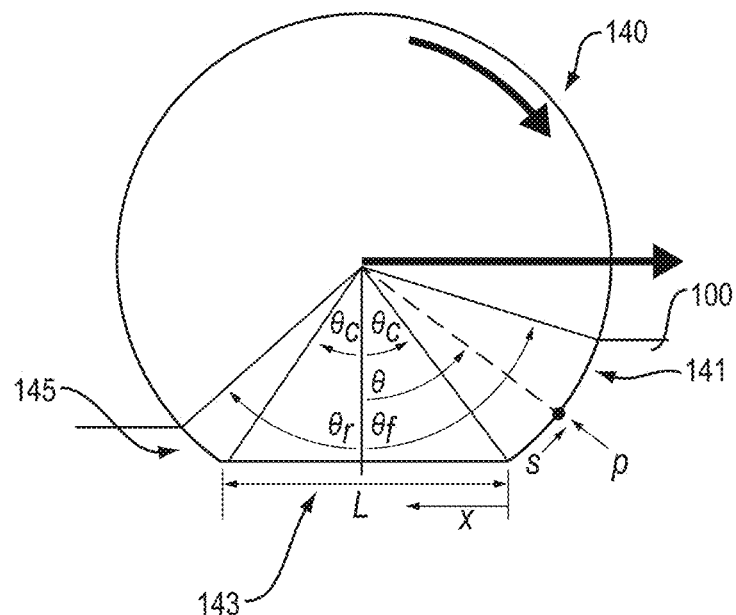
FIG. 2A is a schematic side view of a deformed tire for use in illustrating parameters of a tire perimeter for calculation of forces at a tire-soli interface.
Figure 2B:
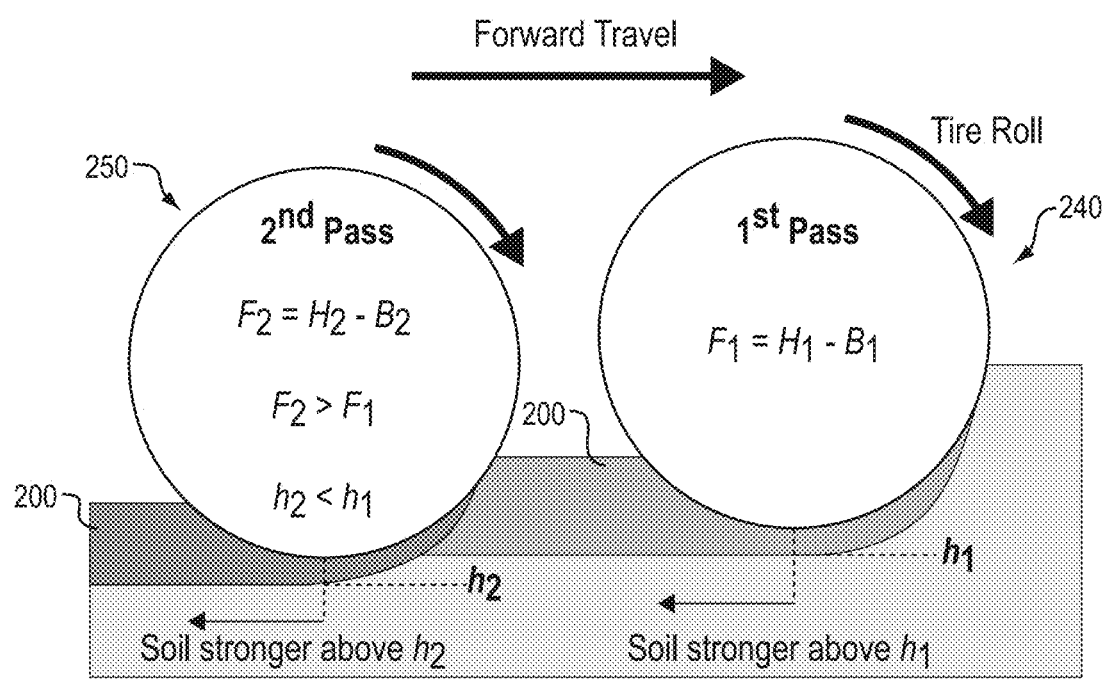
FIG. 2B is a schematic side view of a tire for use in illustrating a tire-soil interaction and multi-pass effect associated with the same.

The forces exerted on agricultural soil by tires affect the mechanical properties of the soil, which is apparent in the plastic deformation in the soil 100 illustrated in FIG. 2A. Each tire pass compacts and strengthens the patch of soil it rolls over, improving the surface for trailing tires. Compaction is accounted for as an increase in the soil's cohesion c and bulk density $\gamma$. FIG. 2B is an idealized diagram demonstrating the interactions of inline drive tires 240, 250 on soil 200 during loading, unloading, and reloading. As shown, h is the depth of the compaction effect on the soil. The second pass tire 250, which is rolling on compacted soil, can generate more drawbar pull F than it would on fresh soil since it sinks less into the soil (reducing bulldozing force B) and the soil can provide a higher shear force (increasing traction force H).

This information related to the traction force and the bulldozing force helps validate the configurations provided for in the present disclosure, resulting in the high-performance vehicle configurations provided for herein. In general, as described by the equations above, traction that can be generated by the tires is substantially proportional to a normal force by the tires against the ground, with that normal force being caused by each of a weight of the vehicle and a vertical force provided by a tool of the vehicle (e.g., a tilling tool) when such tools are being operated.

Third Wheel

Turning back to FIG. 1, the vehicle also includes a third wheel 60, or outrigger wheel, connected to the chassis 20 by way of an outrigger arm 70. The third wheel 60 is offset from the chassis longitudinal axis C-C, but otherwise can be disposed at a variety of locations with respect to the chassis 20, first wheel 40, and second wheel 50. As shown, the third wheel 60 is disposed behind the first wheel 40 and is axially aligned with the second wheel 50. More particularly, a center of the second wheel 50 and a center of the third wheel 60 are disposed along an alignment axis A-A, and the alignment axis A-A is substantially perpendicular to the chassis longitudinal axis C-C. In other embodiments, the third wheel 60 may be disposed offset from the chassis longitudinal axis C-C and disposed at a location that is somewhere in-between the first and second wheels 40, 50 when the vehicle 10 is viewed from a side. That is, the third wheel 60 can be disposed on an offset longitudinal axis (not drawn) that is substantially parallel to the chassis longitudinal axis C-C, the third wheel 60 being disposed somewhere along the offset longitudinal axis between a location where an axis extending through a length of the first axle 42 intersects the offset longitudinal axis and a location when an axis extending through a length of the second axle 52 intersects the offset longitudinal axis. In some embodiments, the engine or motor that drives the first and/or second wheels 40, 50 can also drive the third wheel 60, or alternatively, another engine or motor can be operated to drive the third wheel 60. In other instances, like the one illustrated, the third wheel 60 is not separately driven.

Outrigger Arm

The third wheel 60 can be connected to the outrigger arm 70 using known techniques, such as a third axle 62 and related components. While the third wheel 60 can have a similar configuration as the first and second wheels 40, 50, in the illustrated embodiment it has a similar diameter but a smaller width. The similar diameter is appropriate so that the vehicle 10 is generally stable with respect to the ground. The smaller width is sufficient at least because the vehicle 10 is typically designed to have a substantial majority of the total mass of the vehicle 10 (at least approximately 70% of the total mass of the vehicle, more particularly at least approximately 80% of the total mass of the vehicle, even more particularly at least approximately 85% of the total mass of the vehicle, and still even more particularly, at least approximately 90% of the total mass of the vehicle) supported on the first and second wheels 40, 50 and/or the chassis 20 rather than on the third wheel 60 and/or the outrigger arm 70. Nominally, in some embodiments, less than about 10% of the total mass of the vehicle 10 is supported by the third wheel 60 and/or the outrigger arm 70. A total mass of the vehicles of the present disclosure can be approximately in the range of about 100 kilograms to about 700 kilograms, and in some embodiments the total mass can be about 500 kilograms, while in other embodiments the total mass can be about 125 kilograms.

The outrigger arm 70 is provided to connect the third wheel 60 to the vehicle chassis 20 and/or the second wheel 50. The outrigger arm 70 can have many different configurations, but in the illustrated embodiment it is a substantially rectangular prism, i.e., a bar having a rectangular cross-section, that has a longitudinal axis B-B extending through the entire length of the arm 70 that is substantially perpendicular to the chassis longitudinal axis C-C. As a result, the arm 70 itself is also substantially perpendicular to the chassis longitudinal axis C-C and is substantially parallel to the ground. In the illustrated embodiment the arm 70 includes two bars 72, 74 that are substantially parallel to each other with a coupling mechanism 76 disposed at a distal end of the bars, approximately above the third wheel 60. The coupling mechanism 76 includes a ballast mount 78, as shown a receiving rod, disposed between the two bars 72, 74, the ballast mount 78 being for receiving a ballast, a block 80 coupled to the ballast mount 78, and two opposed linkage bars 82, 84 coupled to the block 80, extending towards the ground such that the third wheel 60 is disposed between the two opposed linkage bars 82, 84. The axle 62 extends between the two linkage bars 82, 84. A person skilled in the art will recognize many other ways by which the third wheel 60 can be associated with the outrigger arm 70.

While in the illustrated embodiment a main body of the arm 70 is substantially perpendicular to the chassis longitudinal axis C-C and substantially parallel to the ground, other configurations are also possible. For example, the arm 70 can be disposed at a non-orthogonal angle with respect to the chassis longitudinal axis C-C (e.g., approximately 85 degrees, approximately 80 degrees, approximately 75 degrees, approximately 70 degrees, etc.). Further, while in the illustrated embodiment the outrigger arm 70 and the third wheel 60 are disposed on a same side of the chassis 20 as a tool 90, in other embodiments the outrigger arm 70 and third wheel 60 can be disposed on an opposite side of the tool 90, meaning the outrigger arm 70 and third wheel 60 can be disposed on either side of the chassis 20. Likewise, the shape of the arm 70 can be such that it is not necessarily parallel to the ground. For example, it may be advantageous for the main body of the arm to be substantially curved or arcuate such that it is concave with respect to the ground, referred to herein as an arched configuration. That is, a distance from the ground is greater for a central portion of the arm than portions on either end of the arm, thereby allowing crops to more easily pass under the arm.

Further, as discussed above with respect to the positioning of the third wheel 60 with respect to the first and second wheels 40, 50, although in the illustrated embodiment the outrigger arm 70 extends substantially between the second and third wheels 50, 60, other configurations are possible. For example, the outrigger arm 70 can extend between the chassis 20 and the third wheel 60 with the outrigger arm longitudinal axis B-B intersecting the chassis longitudinal axis C-C at a location between the first and second wheels 40, 50. A person skilled in the art will recognize that even in instances in which the outrigger arm 70 is not a substantially straight bar like the illustrated arm, a longitudinal axis can still be defined by a length of the arm, the longitudinal axis being an axis that extends from opposed ends of the arm in a substantially straight line that can be fit within a plane that extends through the length of the arm. A height of the outrigger longitudinal axis B-B with respect to the ground can depend on a variety of factors, including but not limited to the intended farming operations being performed and the dimensions of the related components of the vehicle, but in some embodiments a height between the ground and the outrigger arm longitudinal axis B-B can be approximately in the range of about 0.5 meters to about 2.0 meters, and in some embodiments it can be about 1 meter.

The outrigger arm 70 can be configured in a manner that allows its dimensions to be changed as well. This can include, for example, a length, a width, and/or a height of the outrigger arm 70. Thus, in some embodiments the outrigger arm 70 can be adjusted between the illustrated straight-arm configuration and an arched configuration. This can be done, for example, by utilizing a material, such as a shape-memory material (e.g., nitinol), that allows for manipulation between two configurations and/or by including mechanical aspects of the arm that allow for the shape and position of the arm to be adjusted. Likewise, the outrigger arm 70 can be selectively moved in a substantially lateral direction, i.e., substantially perpendicular to the chassis longitudinal axis C-C, to change a distance between the third wheel 60 and the chassis 20.

Further, the outrigger arm 70 can be designed in a manner that allows it and/or the third wheel 60 to be easily stowed, allowing the transformation of the vehicle 10 from a farming configuration to a transportation configuration to be relatively seamless. For example, in some embodiments the outrigger arm 70 can be easily dismounted from the chassis 20 and either left behind, for instance with the third wheel 60, at a farming site for subsequent reattachment or otherwise stowed. The outrigger arm 70 and/or the third wheel 60 may be able to be stored on the vehicle 10 itself, such as in a storage compartment associated with the chassis 20 and/or on a trailer towed by the vehicle 10. In some embodiments, the outrigger arm 70 may be manipulatable to allow it to be moved and/or stored when the vehicle 10 is being used in a transportation configuration. By way of non-limiting example, the arm 70 may be foldable so its footprint can be decreased and more easily stored on/in the chassis 20 or in other components of the vehicle 10. Alternatively, or additionally, the arm 70 can be rotated in a manner that allows the third wheel 60 to be moved out of its offset-farming configuration. For example, in some instance, the outrigger arm 70 can be rotated approximately 90 degrees counter-clockwise, as shown CC, in the illustrated embodiment such that the third wheel 60 is disposed substantially behind the second wheel 50, and at least slightly raised so that the third wheel 60 does no contact the ground. Additionally, or alternatively, the bar(s) of the outrigger arm 70 can be folded, for example approximately at the midpoint, allowing the third wheel 60 to be raised off the ground. This distance off the ground can be equivalent to at least a radius of the first wheel 40. A person skilled in the art, in view of the present disclosures, will recognize many ways by which the outrigger arm 70 can be manipulated to allow the third wheel 60 to be stored on or otherwise removed from the vehicle 10 such that the vehicle 10 can be driven on a transportation configuration in which just the first wheel 40 and the second wheel 50 are in contact with the ground. Likewise, a person skilled in the art, in view of the present disclosures, will recognize a variety of storage positions in which the third wheel 60 can be stored while the vehicle 10 is used in the transportation configuration with the first and second wheels 40, 50 in contact with the ground and the vehicle 10 being driven. The storage positions are typically considered to be positions in which the third wheel 60 and/or the outrigger arm 70 is stored in some manner with the vehicle 10 itself, but alternatively, the third wheel 60 and/or the outrigger arm 70 can be altogether removed and later re-connected to the vehicle 10 for use in a farming configuration.

The outrigger arm 70 can also be adapted to carry a load of a tool, whether by coupling a tool to some portion of the body of the outrigger arm 70, coupling a tool to the third wheel 60 or the components that couple the third wheel 60 to the outrigger arm 70 (e.g., the coupling mechanism 76), and/or using a tool in place of the third wheel 60.

Tool

As explained herein, a variety of tools can be used in conjunction with the vehicle. The tools are primarily designed to be used with the vehicle in the farming configuration, but at least some tools can also be used when the vehicle is in the transportation configuration, such as tools that are towed behind the vehicle (e.g., a trailer, a sprayer). In the illustrated embodiment, a portion of a cultivation tool 90, such as a tillage tool (in some instances, a heavy tillage tool) or plow tool, is illustrated without the end component that actually performs the tilling or plowing being included. Other embodiments provided for herein illustrate the tool itself. More generally, as shown, in some embodiments the tool 90 can be disposed behind the front wheel 40 and in front of the rear wheel 50, with the tool 90 being laterally offset from the chassis longitudinal axis C-C. In other embodiments, illustrated later, the tool can be disposed behind the rear wheel, and thus also behind the front wheel. In the illustrated embodiment, the offset position of the tool 90 is such that it is at a location closer to the chassis longitudinal axis C-C than the third wheel 60 is located to the chassis longitudinal axis C-C (i.e., a distance between the chassis longitudinal axis C-C and the tool 90 is less than a distance between the chassis longitudinal axis C-C and the third wheel 60 when measured along the same lateral plane). By keeping the tool 90 close to the chassis 20, it can provide a benefit of improved traction, at least due in part to the weight of the tool 90 being close to the chassis 20. However, this benefit can be overlooked, or become less important, in instances where it may be desirable to have the flexibility of selectively positioning the tool 90 and/or the outrigger arm 70 during use by laterally adjusting a location of either or both during operation, as discussed in greater detail elsewhere in this disclosure.

The tool 90 in the illustrated embodiment includes a manual controller 92 for setting the location of the tillage tool with respect to the ground, also referred to as a tool depth control mechanism. As shown, the controller 92 includes a handle or crank 94 that can be rotated to move a rack 96 substantially perpendicular to the ground, and thus adjust the location of the tillage tool disposed at a distal end 96d of the rack 96, proximate to and/or disposed in the ground. The location of the tool 90 in an offset configuration can be such that it can be easily viewed by a user during operation. This allows the user to be able to control operation of the tool 90 based on visual observation(s) of the tool. In the illustrated embodiment, and for other operations with a high drawbar pull in which this lateral offset positioning may be preferred, the tool 90 can be mounted longitudinally behind the front axle 42 and ahead of the rear axle 52. In other instances where a low drawbar pull operation may be more appropriate, such as crop spraying or mechanical de-weeding, the tool or trailer can be mounted behind the rear axle 52 and the outrigger arm 70 and third wheel 60 can be removed, meaning that in certain instances a farming configuration can be one that only utilizes the front and rear wheels 40, 50 without the third wheel 60.

The tillage or plow tool can be configured to be driven towards by an active force, into the ground over which the vehicle is traveling. The active force can be supplied, for example, by an operator of the vehicle 10, either directly or indirectly. A non-limiting example of a direct supply of the active force is an operator taking an action, such as turning a knob, that causes a linkage or the like, to drive the tool downwards. In the illustrated embodiment, this can be done, for instance, by rotating the crank 94 to drive the rack 96, and thus the tool disposed at the distal end 96d of the rack 96, downwards. A non-limiting example of an indirect supply of the active force is an operator taking an action, such as pushing a button, that causes the motor, or a separate motor, to in turn apply a force to a linkage or the like to drive the tool downwards. A person skilled in the art, in view of the present disclosures, will understand many ways by which the tool(s) can be operated in conjunction with operating the vehicle without departing from the spirit of the present disclosure. The application of the active force, in turn, can cause the tool 90 to apply force to, and enter into, the ground to perform its tilling/plowing function. The applied force by the tool 90 can be a substantially horizontal force that cultivates the ground. The tool 90 can also be configured to apply a second active force, such as to the vehicle 10 itself, thereby causing the vehicle 10 to be pulled towards the ground while a position of the tool 90 with respect to the ground remains substantially constant.

While in the illustrated embodiment the tool 90 is in a fixed offset location with respect to its lateral distance from the chassis longitudinal axis C-C, in other embodiments the tool 90 can be configured to be moved laterally with respect to the chassis longitudinal axis C-C. Such movement can occur prior to beginning a particular farming operation, or alternatively, it can occur during the course of performing a farming operation. Accordingly, the tool 90 can be moved laterally with respect to the chassis longitudinal axis C-C while the vehicle 10 is moving and/or while the tool 90 is being operated. Further, while in the illustrated embodiment the tool 90 is illustrated in an offset position, in other embodiments the tool 90 can be aligned with a plane that extends through the chassis, towards the ground and sky, and encompasses the chassis longitudinal axis C-C. This configuration is more typical in instances in which the tool 90 is located behind the rear wheel 50.

Engine or Motor

One or more engines or motors 32 can be mounted within the chassis 20. The terms engine and motor are used interchangeably herein, with one term being intended to cover the purpose of both. That is, regardless of whether the power to create the mechanical power or energy to drive the vehicle is created electrically, mechanically, chemically, or otherwise, the term engine or motor as used herein is intended to cover all such variations. As shown, the engine 32 is disposed behind the first wheel 40. While in the illustrated embodiment the engine 32 is configured to mechanically drive both the front and rear wheels 40, 50, in other configurations it may drive one of the two front and rear wheels 40, 50 and/or it may drive them in a manner other than mechanically. In the illustrated embodiment the engine 32 is mounted low in the chassis 20, approximately longitudinally and laterally central between the front and rear wheels 40, 50. The engine 32 can be operated in a manner such that a frequency of rotation can be held steady over a desired period of time.

The vehicle 10 can also include one or more power take-off points 34, 36. The engine 32 can provide power take-off, for example, at the illustrated take-off points 34, 36. As shown, there are two power take-off points 34, 36—a first 34 between the front and rear axles 42, 52 and a second 36 behind the rear axle 52. In the illustrated embodiment the first power take-off 34 is configured to rotate substantially perpendicularly to a centerline of the vehicle 10, the centerline being, or parallel to, the chassis longitudinal axis C-C, and the second power take-off 36 is configured to rotate substantially parallel to the centerline of vehicle 10, although other configurations are possible. In some instances, only one power-take off may be provided, such as the first or the second power take-offs 34, 36 as illustrated. The rotation speed of the power-takeoffs 34, 36 can be coupled to the frequency of rotation of the motor 32, such as in instances in which the motor is operated to hold the frequency of rotation steady over a desired period of time.

The engine or motor 32 can be used to help power other features of the vehicle 10, such as operation of the tool(s) 90 and/or a location of the third wheel 60 and/or the tool(s) 90. By way of non-limiting example, the manual control 92 can be operated by the engine or motor. Alternatively, one or more gearboxes can be included that assist in controlling the various movements of the components of the vehicle 10, including but not limited to the outrigger arm 70, the third wheel 60, and the tool 90.

Further Embodiment of a Vehicle

Figure 3A:
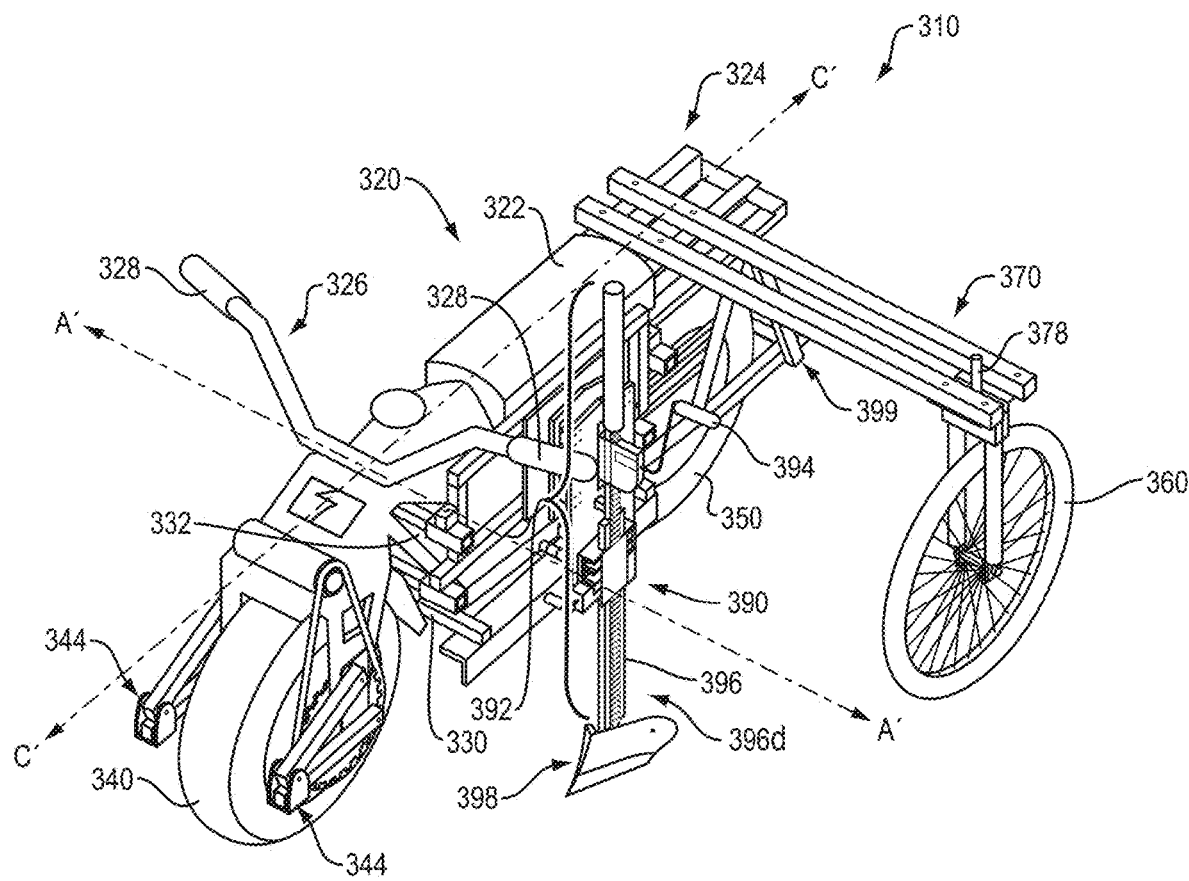
FIG. 3A is an isometric view of another exemplary embodiment of a vehicle.
Figure 3B:
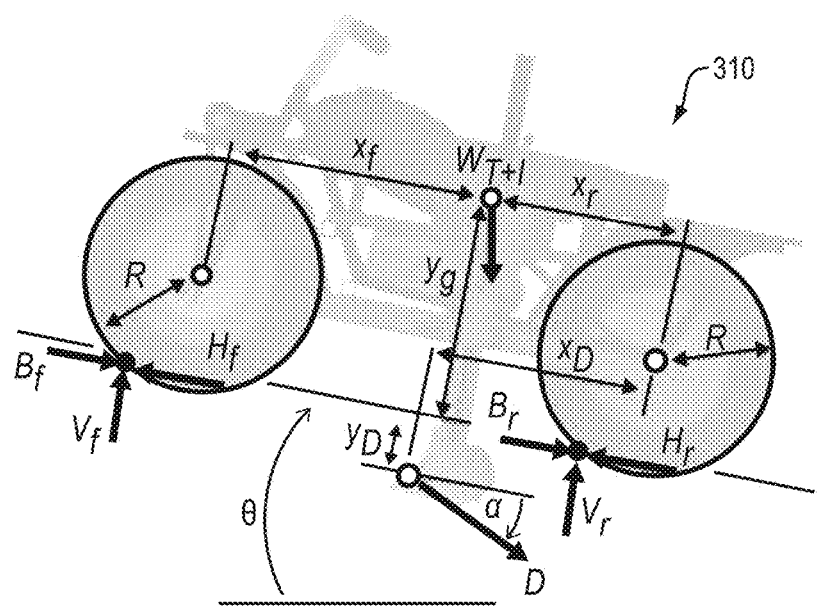
FIG. 3B is a schematic side view of a force free body diagram for the vehicle of FIG. 3A.

FIGS. 3A and 3B illustrate another embodiment of a vehicle 310 configured for use in a farming configuration and a transportation configuration. The illustrated vehicle 310 of FIGS. 3A and 3B is similar to the vehicle 10 of FIG. 1, and thus similar components are not necessarily re-described. It includes: a chassis 320 with handle bars 326, hand-controlled throttles 328, brakes (not illustrated), a driver's seat 322, a secondary seat or storage area 324, and foot peg 330; a first, front wheel 340 configured to provide front-wheel drive, along with a front ballast mount 344; a second rear wheel 350 configured to provide rear-wheel drive; an outrigger arm 370 connecting a third wheel 360 to the chassis 320 and/or the rear wheel 350, the outrigger arm 370 being configured to receive one or more ballasts, such as by way of a ballast mount 378; a motor or engine 332; and a tool 390, along with a tool depth control mechanism 392. Similar to the vehicle 10 of FIG. 1, the first and second wheels 340, 350 are vertically aligned along a chassis longitudinal axis C'-C', with the second wheel 350 being behind the first wheel 340, and the second and third wheels 350, 360 are aligned along an alignment axis A'-A' that is substantially perpendicular to the chassis longitudinal axis C'-C'. Again, the third wheel 360 can be positioned at other locations between the first and second wheels 340, 350, with the third wheel 360 being offset from the chassis longitudinal axis C'-C'. When the outrigger arm 370 helps keep the third wheel 360 in contact with the ground, the vehicle 310 can be in a farming configuration, and when the outrigger arm 370 is moved or otherwise removed such that the third wheel 360 is no longer in contact with the ground, the vehicle 310 can be in a transportation configuration. As explained herein, in some instances the vehicle 310 can be used for farming purposes even when in the transportation configuration. Likewise, the vehicle 310 technically can be operated for transportation purposes when the third wheel 360 is in contact with the ground.

While in the illustrated embodiment the tool 390 includes a rack 396 and a manual controller crank 394, it differs from the vehicle 10 in that one non-limiting exemplary embodiment of a tool is disposed at a distal end 396d of the rack 396. As shown, a central tillage tool 398 can be disposed at the distal end 396d of the rack 396, and can be operated in a manner as described herein or otherwise known by those skilled in the art. Other tools can be used in conjunction with the vehicle 310, either in place of the central tillage tool 398 while still associated with the rack 396 or associated with the vehicle 310 by way of other attachment locations. For example, as shown, a mounting rack 399 can be disposed proximate to and at least partially behind the rear wheel 350. The mounting rack 399 can be used to attach one or more tools thereto and/or otherwise have the tool(s) mounted on top of or otherwise connected to the rack 399.

FIG. 3B in particular is provided to illustrate a force free body diagram of the present design of the vehicle 310. Shown are the vehicle ground reaction forces ($V_f, V_r, B_f, B_r, H_f$ and $H_r$), which support the vehicle weight ($W_T$, which is the weight of vehicle alone and $W_{T+1}i$, which is the weight of the vehicle in combination with an implement, i.e., tool, attached) and tool draft (D). Key dimensions are shown in FIG. 3B, including the tire radius (R for both tires in the illustrated embodiment, but does not have to be that way), ground slope ($\theta$), vehicle CG location ($x_f, x_r,$ and $y_g$), tool draft center of pressure ($x_D$ and $y_D$), and tool draft angle ($\alpha$).

In the illustrated embodiment, which is also true with respect to the vehicle 10 of FIG. 1, the vehicle mass is almost exclusively supported on the driven wheels, i.e., the first and second wheels 340, 350. Only the first and second driven wheels 340, 350 apply a positive (drawbar pull generating) shear stress, s, on the soil. The maximum drawbar pull, F, that a tire can generate, as shown above with respect to Equations 4-6, is limited by soil shear strength, which depends on tire-soil pressure, p, and soil cohesion, c (term $c+p \tan(\varphi)$ in Equation 2). The shear strength of the soil can be improved by increasing pressure or by increasing soil cohesion, such as via soil compaction induced by inline drive wheels. Increasing tire-soil pressure for drive wheels can be best achieved by placing more vertical load on the tires, because reducing tire width, w, or radius, R, to lower their contact area would also scale down the magnitude of traction force H in Equation 4. It can also be beneficial to limit pressure on non-driven wheels to only what is needed for stability. Idle wheels can detract from the drawbar pull F of the vehicle since they generate no measurable traction force H (since s=0) and can still generate a significant bulldozing force B, which increases with applied tire-soil pressure p, as shown in Equation 5.

Shifting weight towards the driven tires can achieve a high drawbar pull to mass ratio. A pneumatic agricultural tire can generally generate as drawbar pull no more than about 80% of the vertical load it supports, and a conventional tractor design has approximately 50% to 80% of its total mass on its driven rear wheels. Shifting more weight to the rear wheels in this layout would increase the risk of upending the vehicle and reduce vehicle safety. A conventional tractor is therefore nominally able to pull up to about 64% of its operating weight (even less if considering the detrimental bulldozing forces from idle wheels) in near ideal conditions, and much less in non-ideal conditions. Changing the layout to support all of the mass on the drive wheels should increase the maximum pull capacity to about 80% of the operating weight of the vehicle. If a vehicle layout must use additional idle wheels for stability, they should be designed so that stability can be achieved while only lightly loading the idle wheels—therefore limiting the detracting opposing force they can generate and maximizing the mass supported by drive wheels.

The illustrated embodiment of the vehicle 310, just as the embodiment of the vehicle 10 in FIG. 1, also matches tire ground pressure to required soil shear stress by operating approximately in the range of about 10% tire slip to about 25% tire slip. A tire slip of this range can be an efficient compromise between energy losses to soil shear deformation j (which is a function of tire slip i) and to soil bulldozing B. A well-designed vehicle should have its mass and tires sized appropriately to reach its desired drawbar pull F in that tire slip range. To increase the drawbar pull generating traction force H, the applied soil shear stress s should be increased, which increases with i (see Equation 2), or increase the tire contact area (term wR in Equation 4). Some soil shear deformation generally at the tire-soil interface to generate a traction force H. Reducing tire-soil slip while maintaining constant applied shear stress can require increasing the soil pressure, p, which can be done by adding ballasts to the vehicle. However, increasing pressure can also result in a larger tire bulldozing force B (see Equation 5), which is detrimental to drawbar pull F (see Equation 8). If instead ground pressure is adjusted by changing tire size (i.e., contact area), the wR term can be affected in both H (see Equation 4) and B (see Equation. 7), causing them both to either increase or decrease simultaneously. Therefore, an all-encompassing design rule cannot be given but it can be advantageous to use the model associated with FIGS. 2A and 2B to select tire sizes and a weight distribution that generates sufficient drawbar pull while staying in the desirable tire slip range.

Still further, the illustrated embodiment, just as the embodiment of FIG. 1, uses inline drive wheels (i.e., the first and second wheels) with similar vertical loads. Compared to side-by-side wheels, inline drive wheels increase vehicle drawbar pull and efficiency because the rear drive wheel operates on soil that has become stronger (higher cohesion, c, and bulk density, $\gamma_s$) after being compacted by the front drive wheel. In conventional tractors the front drive wheels are typically much smaller and lightly loaded compared to their rear side-by-side drive wheels. Accordingly, the front wheels do not strengthen the soil significantly for the rear drive wheels. In agriculture, soil compaction is often considered undesirable because it hinders crop growth. However, the inline drive wheels of the present embodiments leverage a technique known as "controlled traffic," in which one patch of soil is driven over multiple times rather than driving over more areas of soil only once. This method takes advantage of the fact that if all tire passes are equivalent, compaction will be highest after the first pass and much lower for subsequent passes. This method is less detrimental to crop yields and has been proven in farm fields across the world.

Additionally, the illustrated embodiment, just as the embodiment of FIG. 1, adds a mount for high drawbar tools between both driven axles. Adding a mount for high drawbar tillage tools between the front and rear axles uses the downward forces from tillage (D*sin($\alpha$)) to increase the vertical loading on both the front and rear wheels, respectively $V_f$ and $V_R$, as shown in FIG. 3B. This results in higher soil-tire pressure, p, and thus higher soil shear strength (represented by c+p tan($\varphi$) in Equation 2). If both axles are driven, this produces a higher maximum traction force H at both drive tires and increases the maximum drawbar pull F of the vehicle, as illustrated in Equations 4 and 6.

Additionally, the central mount can improve steering authority and stability by firmly planting both wheels on the ground, which allows the operator to safely operate the proposed vehicle design near its performance limits. In contrast, the draft force, D, in a conventional tractor design can cause the front wheels to become unweighted; even though the horizontal draft component, D cos($\alpha$), is typically larger than the vertical component, D sin($\alpha$), it exerts a torque over a much shorter moment arm ($y_D$ vs. $x_D$). This unweighting of the front wheels can cause the vehicle to upend (i.e., tip over backwards) and severely injure the operator, and limits the confidence of the operator when operating the farming vehicle near its performance limits. The risk of farming accidents due to the upending of vehicles, e.g., tractors, is mitigated, at least in part, by the added stability of mounting the drawbar tool between the front and rear axles.

Comparison of Vehicle Layout to Other Layouts

Figure 4:
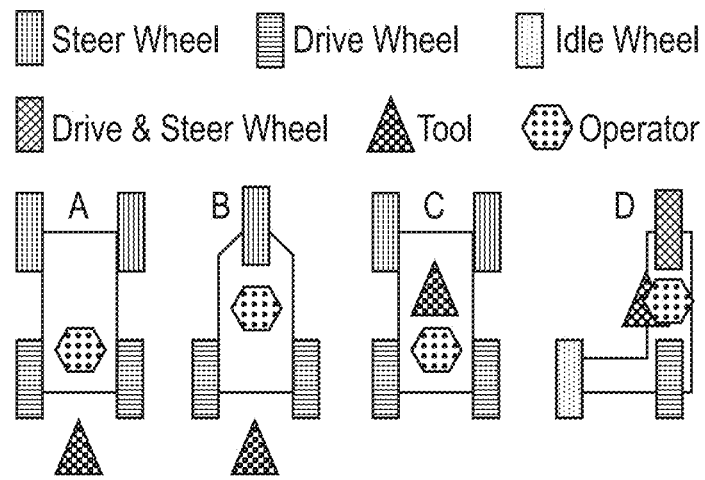
FIG. 4 is a schematic top view block diagram of four different vehicle configuration options, identified as A, B, C, and D, with option D being one exemplary embodiment of a vehicle configuration of the present disclosure.

FIG. 4 illustrates various layout designs that can be used for a farming vehicle, with the layouts A and B representing existing, popular layouts for farming vehicles in India, the layout C representing an existing, popular layout in other countries by farms smaller than their national average, and the layout D representing a layout disclosed herein. These layouts have distinct configurations. For example, layout A is a conventional small farm tractor with side-by-side steering idle wheels on the front axle, side-by-side drive wheels on the rear axle, and a tool behind the rear axle. Layout B is a tricycle tractor similar to the conventional tractor of layout A, but with a single front idle wheel. Layout C has a design similar to the conventional tractor of layout A, but with a tool disposed ahead of the rear axle. Layout D has inline drive wheels and tillage tools between the front and rear drive wheels, in accordance with the present disclosures.

Tool location can impact user comfort and safety, along with the drawbar pull capability of the tractor. Placing the tool behind the rear axle, as in layouts A and B, can improve comfort by keeping soil detritus away from the driver during tillage and, perhaps more importantly, can improve drawbar pull by transferring weight to the driven rear axle during tillage. However, this weight transfer can also be detrimental to comfort and safety, as it can unweight the front wheels, which can result in loss of steering authority and/or, ultimately, in upending the tractor. Placing the tool between the front and rear axles, as in layouts C and D, can improve comfort and safety by placing the action of the tool near the driving line of sight for the operator and reduce or otherwise eliminate the risk of upending the tractor. However, as discussed herein, in at least some instances even layout D can be adapted to include a tool behind the rear axle, either in lieu of or in addition to the offset location of the tool between the front and rear axles of layout D.

Layout D is singular in its ability to enter narrow spaces. Each of layouts A, B, and C is limited by the respective side-by-side drive wheels, which prevent them from straddling crop rows taller than their low ground clearance. In the case of layout B, the situation is worsened by the front wheel requiring a third travel lane, meaning the rows must be widened to accommodate the full vehicle in a single inter-row space or the vehicle must straddle two rows of crop. In these layouts, the major mass components—engine, transmission, and operator—are between, not in line, with the drive wheels. As such, for a vehicle of this configuration to straddle crops, a large amount of mass would typically have to be elevated above the crop height. In tall crops, this is deleterious to the stability of the vehicle and would limit its ability to use ground engaging tools. The inline drive wheels configuration of layout D, however, places all the major mass components in line with the drive wheels. This narrow packaging allows access to inter-row lanes and maintains a low center of mass. Because the third wheel does not generate traction or provide steering, it does not need to bear much weight and can be attached via a simple high ground clearance extension arm from the main tractor frame, such as the various outrigger arms described and/or illustrated herein, or other arm configurations derivable from the present disclosures.

The novel layout D was selected for the present vehicles because it combines the drawbar pull advantages of weight transfer of layouts A and B with the improved safety and comfort of layout C, among other features. Additionally, layout D has a unique ability to operate in narrow spaces, at least because of its improved steering authority due to weight transfer during operations like tillage. The advantages of the vehicles disclosed herein, both in terms of drawbar pull and usability, are significant and allow it to meet the needs of operators of small farms. The inline drive wheels allow the vehicle to enter narrow spaces currently only accessible to bullocks. The combination of the wheel placement and a central tool location improves the drawbar pull per unit mass of the vehicle. Thus, the disclosed design meets the required drawbar pull with a lower overall mass, lowering the purchase price for the user relative to a conventional tractor that can produce equivalent drawbar pull. The vehicles of the present disclosure also meet the needs of farmers for improved comfort and safety by providing improved visibility of the tool (e.g., the tillage tool) and eliminating the risk of upending the vehicle during a farming operation such as tillage. That is, the vehicle can operate near tillage force limits, and other force limits of other tools provided for herein. Additionally, soil compaction, which is detrimental to crop growth, is reduced by limiting the vehicle to a single compaction lane. The present vehicles designs are thus uniquely capable of providing the benefits of both a pair of bullocks and a tractor.

Further Embodiment of a Vehicle

Figure 5:
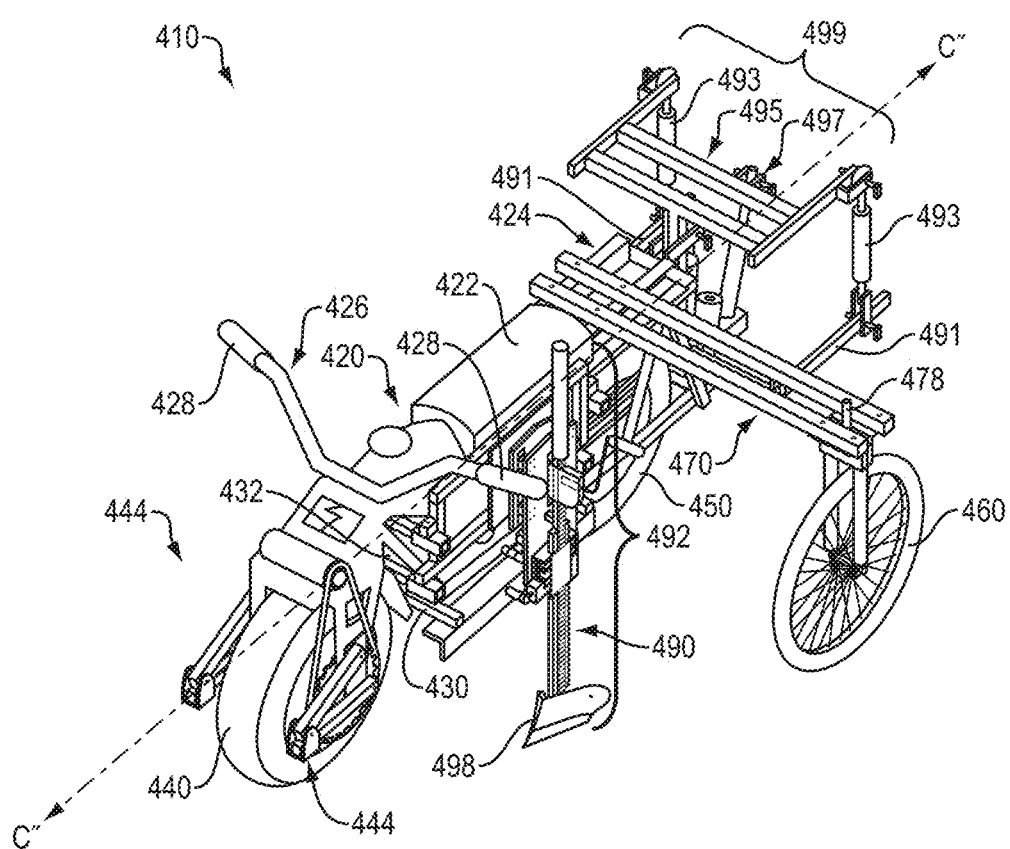
FIG. 5 is a perspective view of the vehicle of FIG. 3A, the vehicle further including a three-point hitch and a ball tow hitch.
Figure 6A:
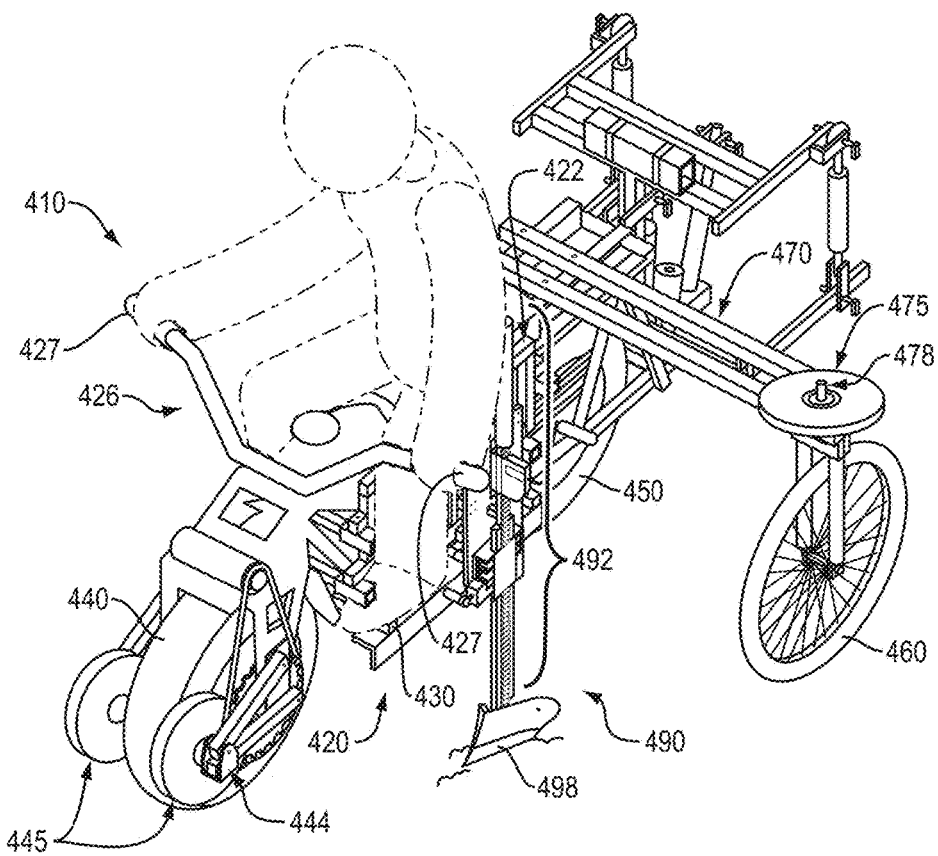
FIG. 6A is a perspective side view of another exemplary embodiment of a vehicle.
Figure 6B:
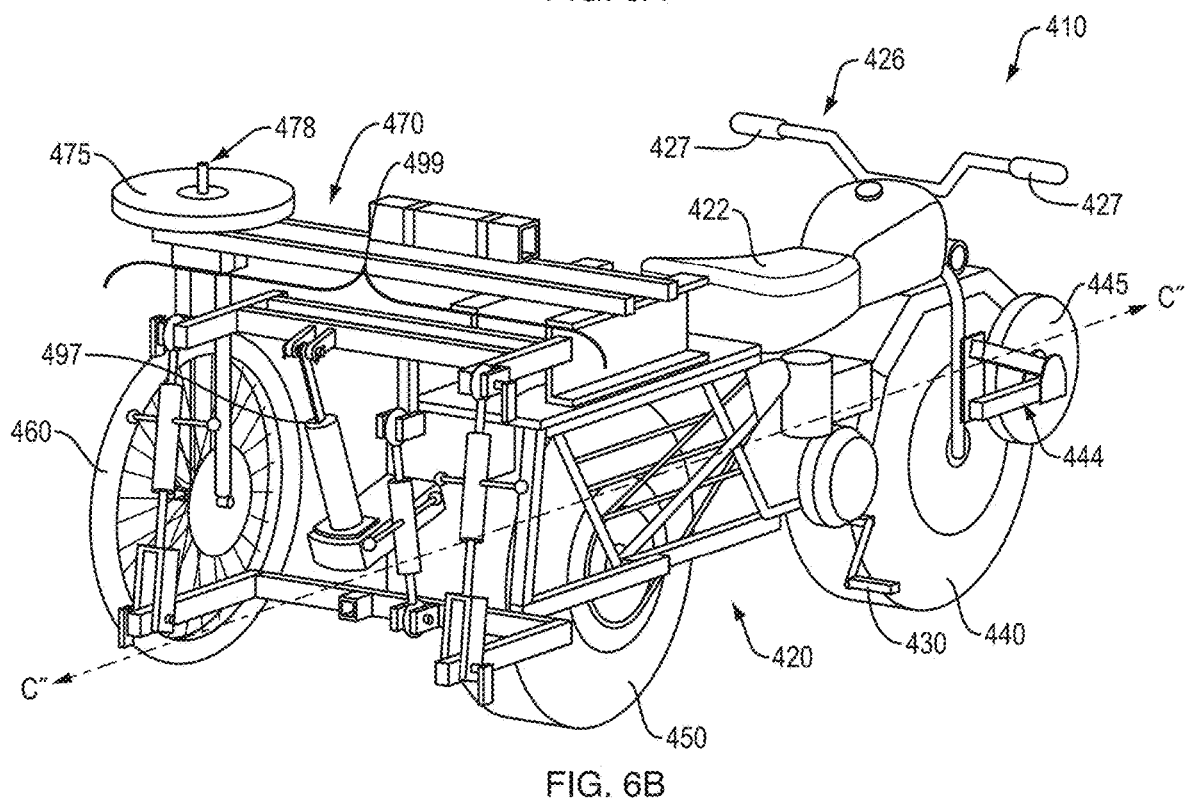
FIG. 6B is perspective rear view of the vehicle of FIG. 6A.
Figure 6C:
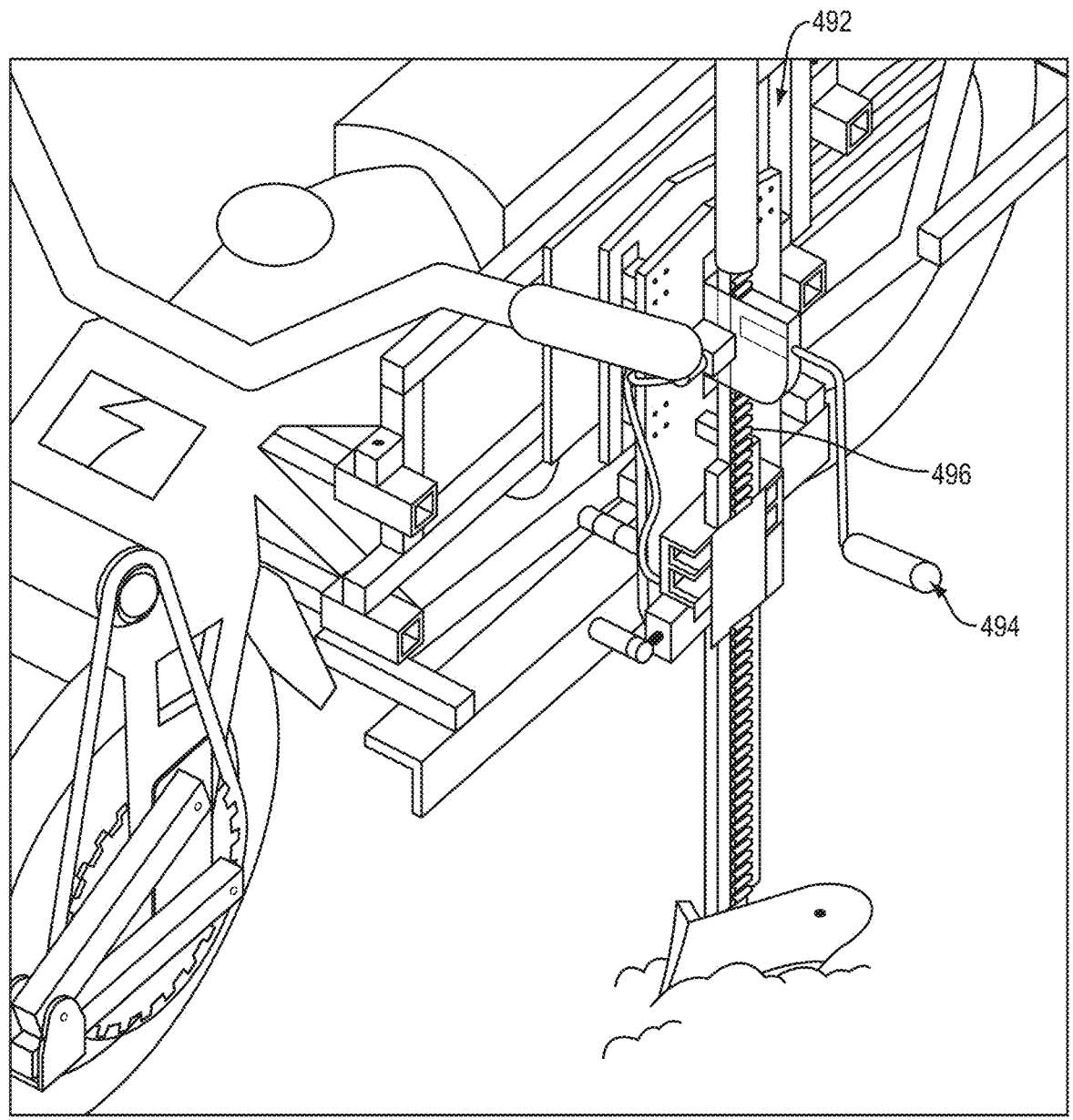
FIG. 6C is a detailed perspective side view of a tool depth control module of the vehicle of FIG. 6A.

FIG. 5 illustrates another embodiment of a vehicle 410 configured for use in a farming configuration and a transportation configuration. The illustrated vehicle 410 of FIG. 5 is similar to the vehicles 10, 310 of FIGS. 1 and 3A and 3B, and thus similar components, such as a chassis 420, handle bars 426, hand-controlled throttles 428, brakes 426 (as shown in FIGS. 6A-6C), seat(s) and/or storage area(s) 422, 424, foot peg 430, front and rear wheels 440, 450, ballast mounts 444, 478, outrigger arm 470, third wheel 460, motor or engine 442432, tool 490, tool depth control mechanism 492 and related components, including a tillage tool 498, are not necessarily re-described. In fact, the layout is similar to the vehicle of FIGS. 3A and 3B, but further includes each of a three-point hitch 499 and a ball tow hitch 497 behind the rear wheel 450. Such hitches 497, 499 can take a variety of configurations, but as shown, the design includes a shelf 495 on which a tool can be disposed for a farming operation, a computer or other data collecting device can be disposed, and/or at least some portion of the outrigger arm 470 and/or the third wheel 460 can be disposed when the vehicle is in a transportation configuration. The shelf 475 is stabilized by additional structures, as shown vertically extending bars 493 and horizontally extending bars 491 that further couple the shelf 495 to the vehicle 410. Other hitches are also possible, and only a single hitch, of a variety of possible configurations including but not limited to those illustrated, can be provided in the alternative. Further, although the illustrated embodiment shows the hitches 497, 499 being mounted directly behind the rear drive wheel 450, in other embodiments the mounts can be positioned further away from the rear drive wheel 450, and/or be laterally offset with respect to the rear drive wheel 450. In some embodiments, a hitch(es) can be coupled to or otherwise used in conjunction with an outrigger arm and/or a third wheel, thus allowing a tool or the like to be dragged behind the third wheel or serving in place of the third wheel.

FIG. 6A illustrates an operator positioned on a vehicle 410' substantially akin to the vehicle 410 of FIG. 5, although there may be slight variations that do not have any noticeable significance to the descriptions provided below, and thus the same reference numerals are used in FIG. 5 and FIGS. 6A-6C. The operator is able to control the various operations by way of the handle bars 426, easily view the tillage tool 498 and control its depth using the tool depth control mechanism 492, and sit comfortably on the seat 422 with the foot peg 430. Ballasts 445 are provided on the opposed ballast mounts 444 proximate to the front wheel 440, and a further ballast 475 is provided on the ballast mount 478 proximate to the third wheel 460. While the ballasts 445, 475 shown in the illustrated embodiment are weighted discs, a person skilled in the art will recognize other objects can be used as ballasts and/or the additional weight can be built directly onto the components of the vehicle 410.

FIG. 6B illustrates the vehicle of FIG. 6A, but the operator is not on the vehicle 410. The foot peg 430 for the foot of the operator can be more visibly seen, as can the in-line nature of the first and second wheels 440, 450 along the chassis longitudinal axis C"-C". Further, FIG. 6B illustrates the three-point hitch 499 and the ball tow hitch 497. FIG. 6C provides a closer look at the tool depth control mechanism 492. As shown, a crank or handle 494 can be rotated to drive a rack 496 up and down with respect to the ground, thereby setting the depth of the tillage tool 498 associated with the distal end of the rack 496.

Embodiments of Tools

FIGS. 7A-7F illustrate various embodiments of tools that can be used in conjunction with the various vehicle configurations provided for herein or otherwise derivable from the present disclosure. A person skilled in the art will recognize how these tools can be operated, as well as the components of the same that are visible and not necessarily labeled. The illustration of these tools is to provide a look at some non-limiting embodiments of tools that can be used in conjunction with the present vehicles, as well as to provide some non-limiting configurations of such tools. The tools provided for herein can generally be coupled to or otherwise associated with the vehicle in a removable and replaceable manner, thus allowing tools to be swapped in and out from a single vehicle as desired. Of course, in some instances a tool can be permanently associated with a vehicle, but such a configuration would not be as versatile because it would not as easily allow for different tools to be used for different purposes on the same vehicle.

Figure 7A:
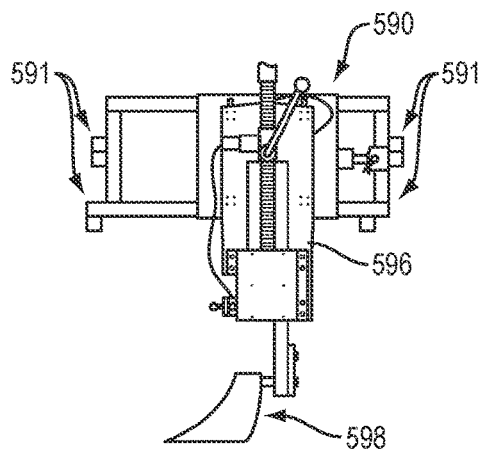
FIG. 7A is side view of one exemplary embodiment of a heavy tillage plow for use in conjunction with the vehicles of the present disclosure.
Figure 7B:
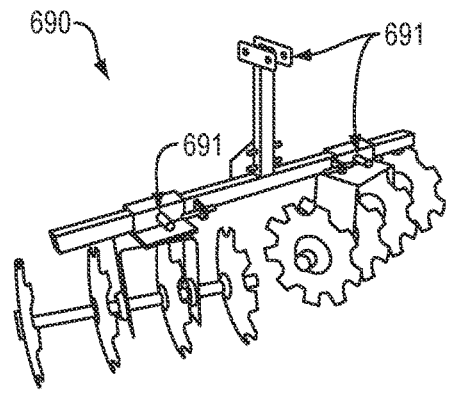
FIG. 7B is a perspective view of one exemplary embodiment of a disc harrows for use in conjunction with the vehicles of the present disclosure.
Figure 7C:
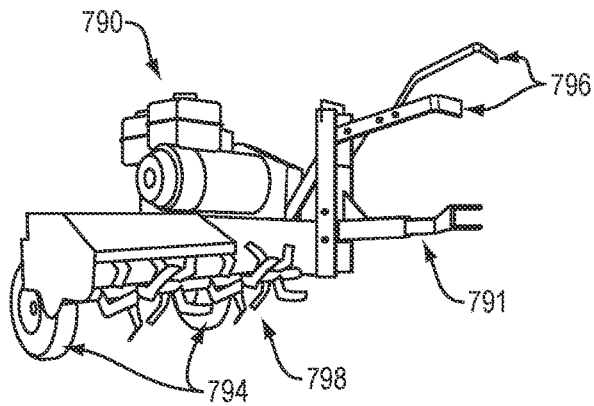
FIG. 7C is a perspective view of one exemplary embodiment of a rotavator for use in conjunction with the vehicles of the present disclosure.
Figure 7D:
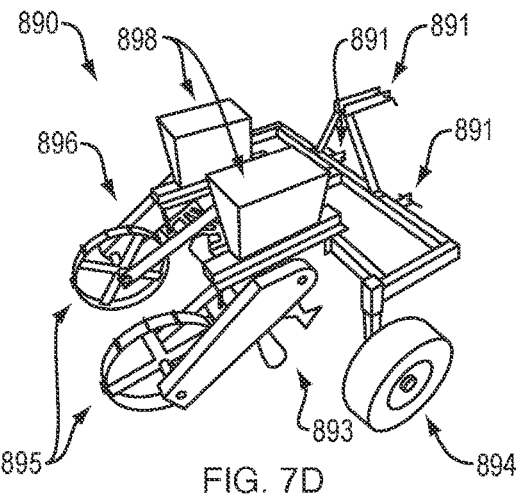
FIG. 7D is a perspective view of one exemplary embodiment of a planter for use in conjunction with the vehicles of the present disclosure.
Figure 7E:
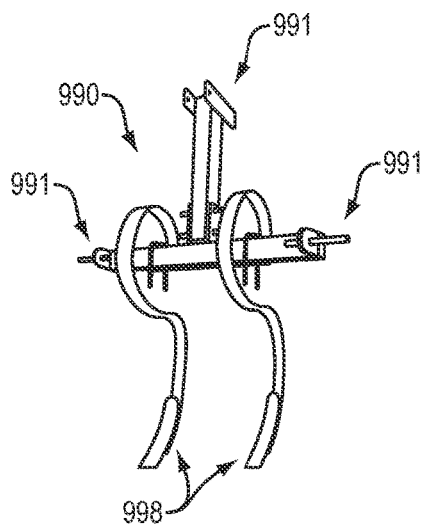
FIG. 7E is a perspective view of one exemplary embodiment of a cultivator for use in conjunction with the vehicles of the present disclosure.
Figure 7F:
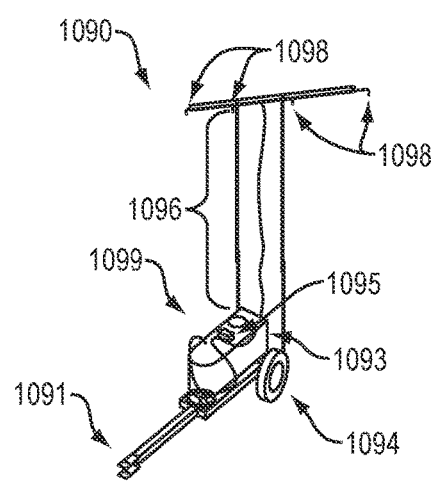
FIG. 7F is a perspective view of one exemplary embodiment of a sprayer for use in conjunction with the vehicles of the present disclosure.

FIG. 7A illustrates one exemplary embodiment of a heavy tillage or plow 590. It can include mounts 591 for being coupled to a vehicle, a rack-and-pinion 596 for operating the tillage tool, and the tool 598 itself. FIG. 7B illustrates one exemplary embodiment of a disc harrows 690. It can include three-point hitch mounts 691, notched disc gangs 698, rotary bearings 694, and a gang adjustment 696. FIG. 7C illustrates one exemplary embodiment of a rotavator 790. It can include spinning blades 798, support wheels 794, control levers 796, and a hitch tongue 791. FIG. 7D illustrates one exemplary embodiment of a planter 890. It can include seed hoppers 898, a seed tube 893, a chain drive 896, distance tracking wheels 895, support wheels 894, and hitch mounts 891 (e.g., three-point hitch mounts). FIG. 7E illustrates one exemplary embodiment of a cultivator 990. It can include compliant tines 998 and hitch mounts 991 (e.g., three-point hitch mounts). FIG. 7F illustrates one exemplary embodiment of a sprayer 1090. It can include a tank 1093, a pump 1095, nozzles 1098, an application gun 1099, an adjustable height 1096, support wheels 1094, and a hitch tongue 1091. Other tools, and other configurations of the illustrated tools, are contemplated by the present disclosure, but the illustration of all such options are not included for the sake of brevity.

Figure 8A:
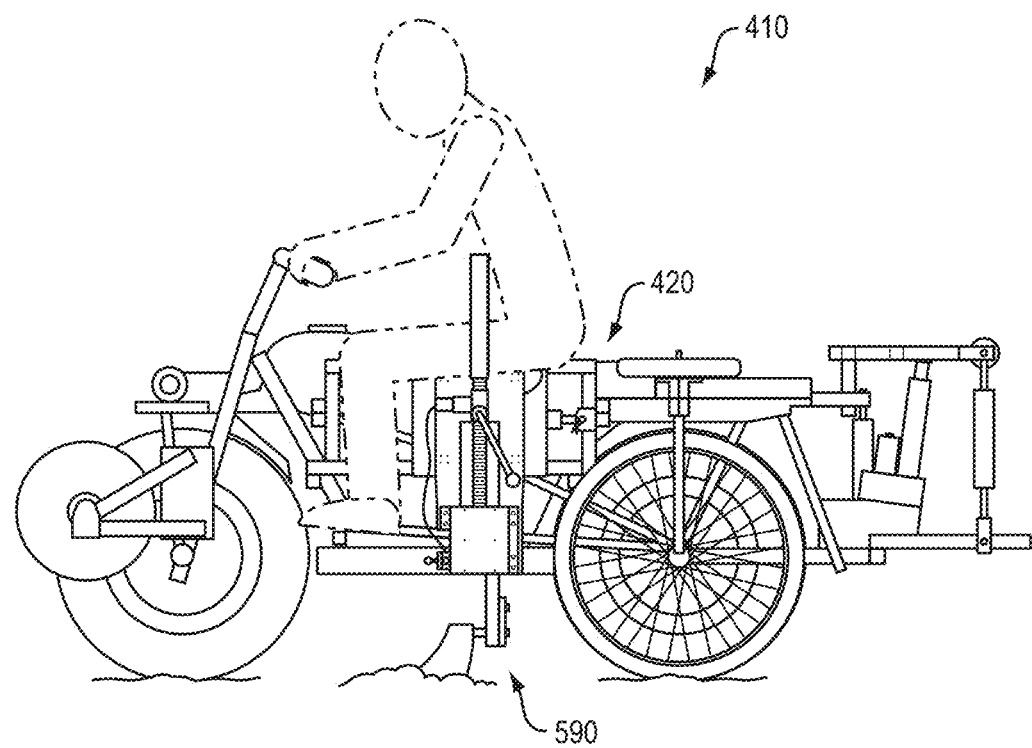
FIG. 8A is a front perspective view of one exemplary embodiment of a heavy tillage plow like that of FIG. 7A mounted to the vehicle of FIG. 6A.
Figure 8B:
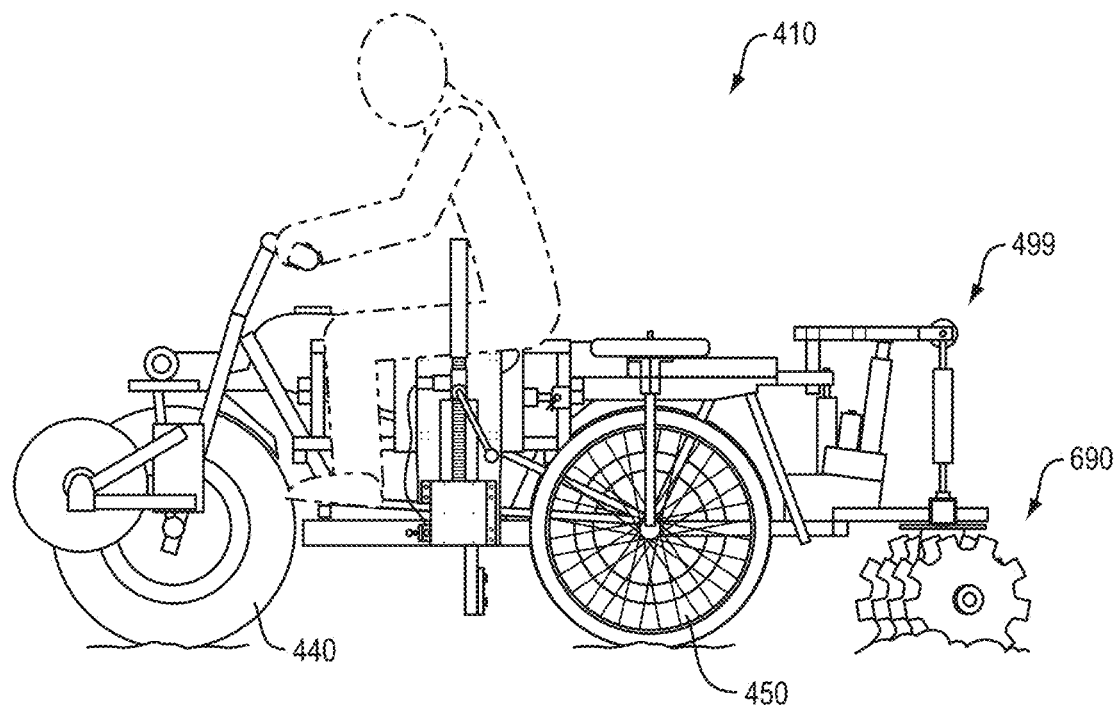
FIG. 8B is a rear perspective view of one exemplary embodiment of a disc harrows like that of FIG. 7B mounted to the vehicle of FIG. 6A.

FIGS. 8A-8H illustrate various instances of ways the tools 590, 690, 790, 890, 990, 1090 of FIGS. 7A-7F, or equivalents thereof, have been utilized in conjunction with the vehicle 410 of FIGS. 6A-6C. For example, FIG. 8A illustrates the tillage tool 590 of FIG. 7A mounted onto the chassis 420 of the vehicle 410 of FIGS. 6A-6C, with the operator driving the vehicle in the farming configuration. Likewise, FIG. 8B illustrates the disc harrows 690 of FIG. 7B mounted to the three-point hitch 499 of the vehicle 410 of FIGS. 6A-6C. As shown, in this configuration, the tool 690 is disposed behind the rear wheel 450 as opposed to between the front and rear wheels 440, 450 like the tillage tool 590.

Figure 8C:
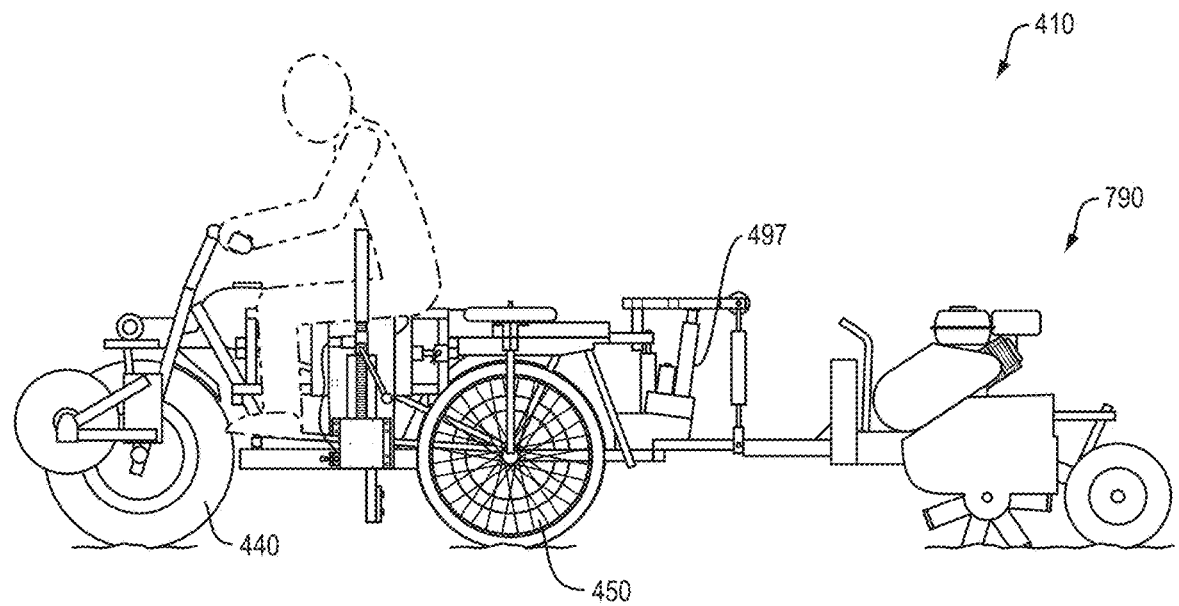
FIG. 8C is a side perspective view of one exemplary embodiment of a rotavator like that of FIG. 7C mounted to the vehicle of FIG. 6A.
Figure 8D:
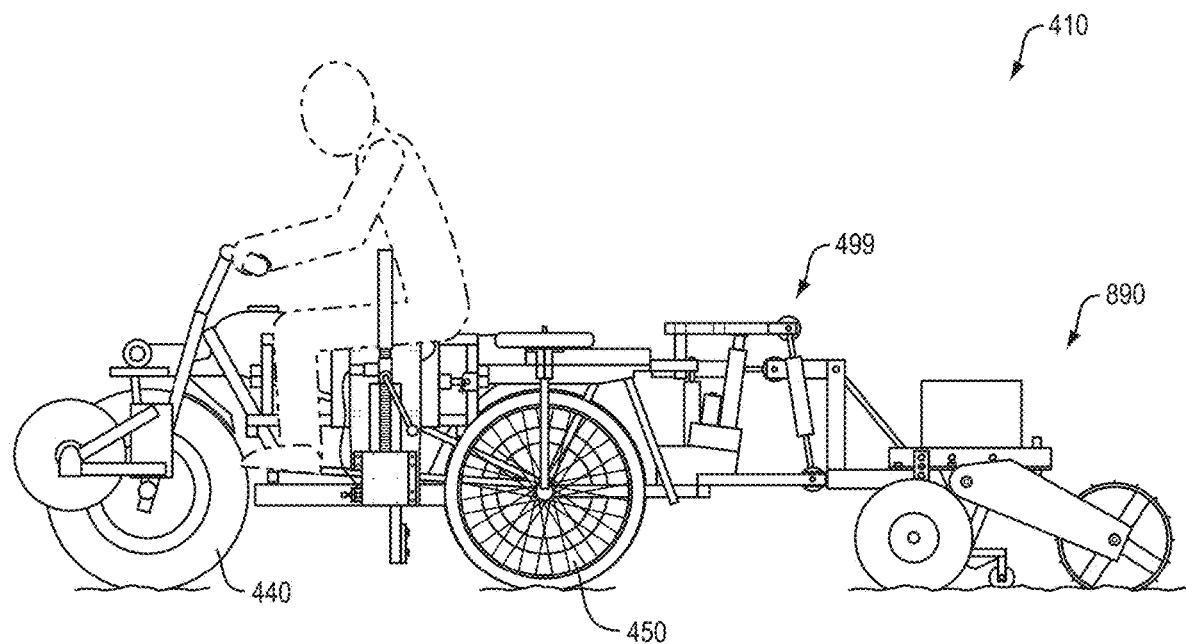
FIG. 8D is rear perspective view of one exemplary embodiment of a planter like that of FIG. 7D mounted to the vehicle of FIG. 6A.
Figure 8E:
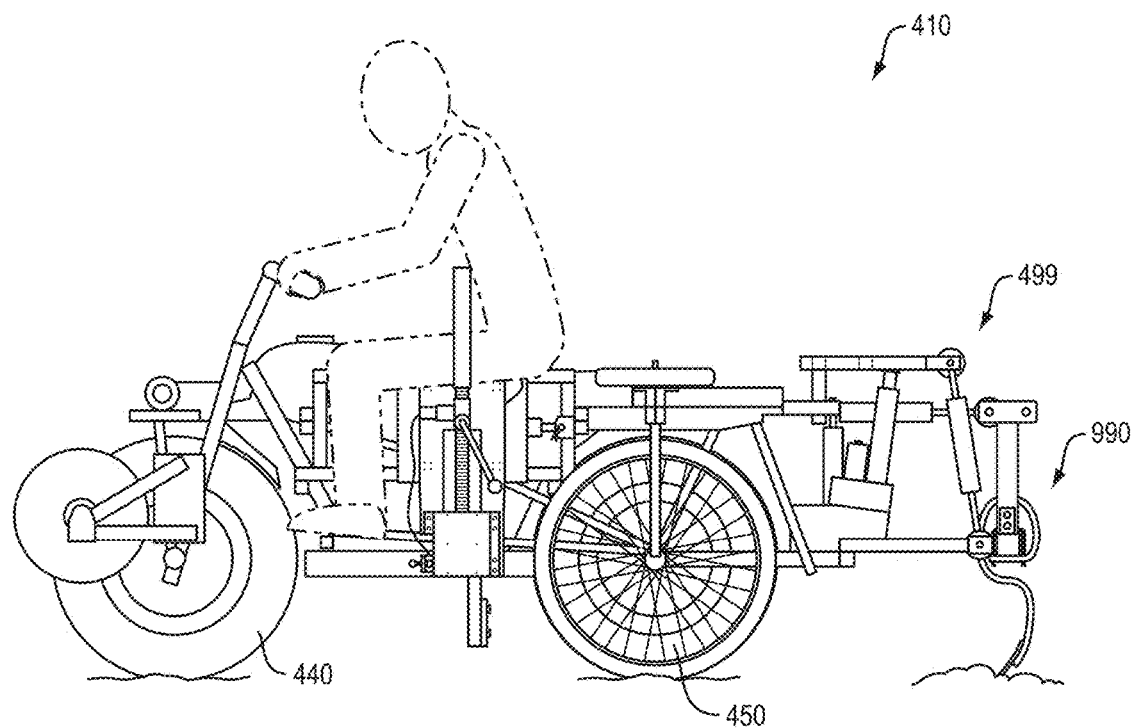
FIG. 8E is a rear perspective view of one exemplary embodiment of a cultivator like that of FIG. 7E mounted to the vehicle of FIG. 6A.

FIG. 8C illustrates the rotavator 790 of FIG. 7C mounted to the ball tow hitch 497 of the vehicle 410 of FIGS. 6A-6C, FIG. 8D illustrates the planter 890 mounted to the three-point hitch 499 of the vehicle 410 of FIGS. 6A-6C, and FIG. 8E illustrates the cultivator 990 mounted to the three-point hitch 499 of the vehicle 410 of FIGS. 6A-6C. Like the disc harrows 690, the tools 790, 890, and 990 of FIGS. 8C, 8D, and 8E are disposed behind the rear wheel 450.

Figure 8F:
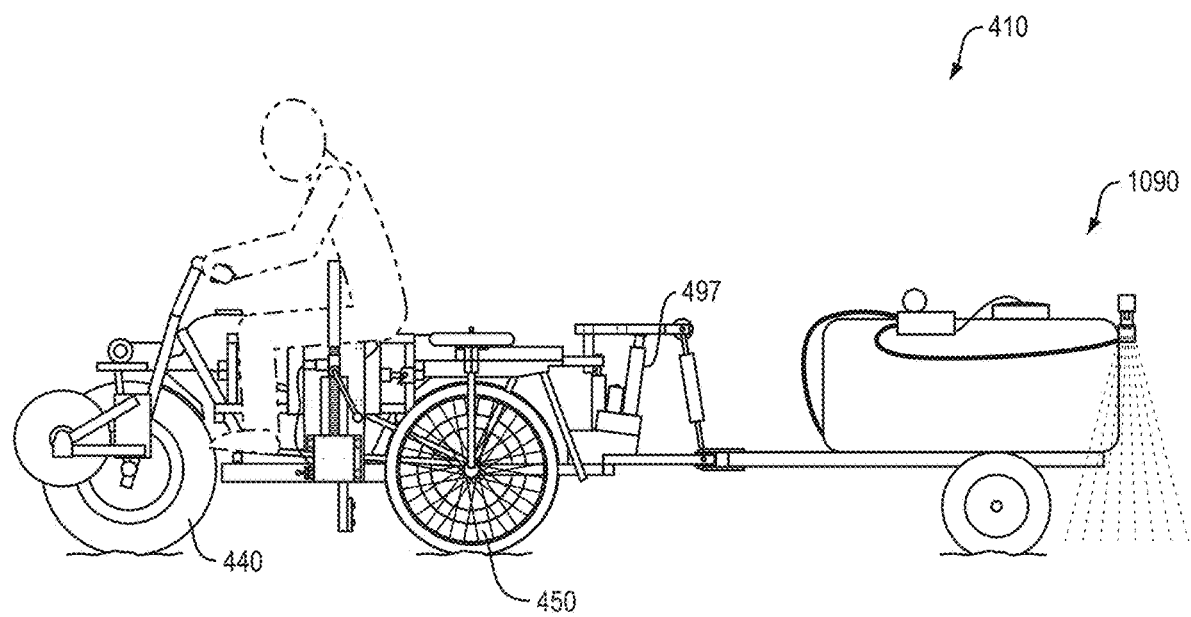
FIG. 8F is a rear perspective view of one exemplary embodiment of a sprayer like that of FIG. 7F mounted to the vehicle of FIG. 6A.

FIG. 8F illustrates the sprayer 1090 of FIG. 7F mounted to the ball tow hitch 497 of the vehicle 410 of FIGS. 6A-6C, however, the outrigger arm 470 and third wheel 460 are removed. Accordingly, the sprayer 1090 is pulled behind the rear wheel 450 while the vehicle 410 is in the transportation configuration. Some of the other tools can also be used in this configuration.

Figure 8G:
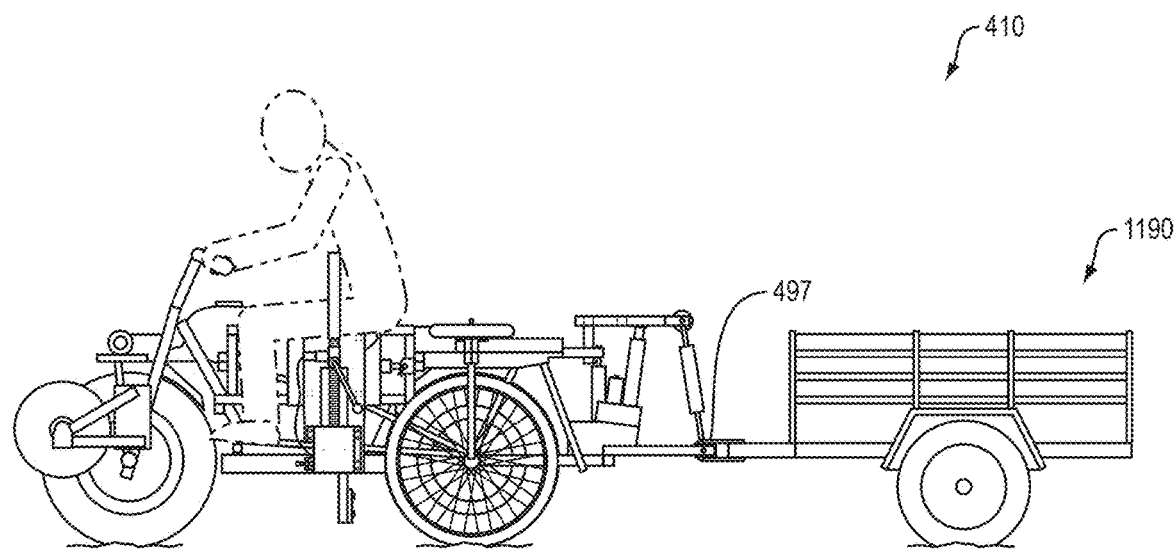
FIG. 8G is a front perspective view of one exemplary embodiment of a trailer mounted to the vehicle of FIG. 6A.
Figure 8H:
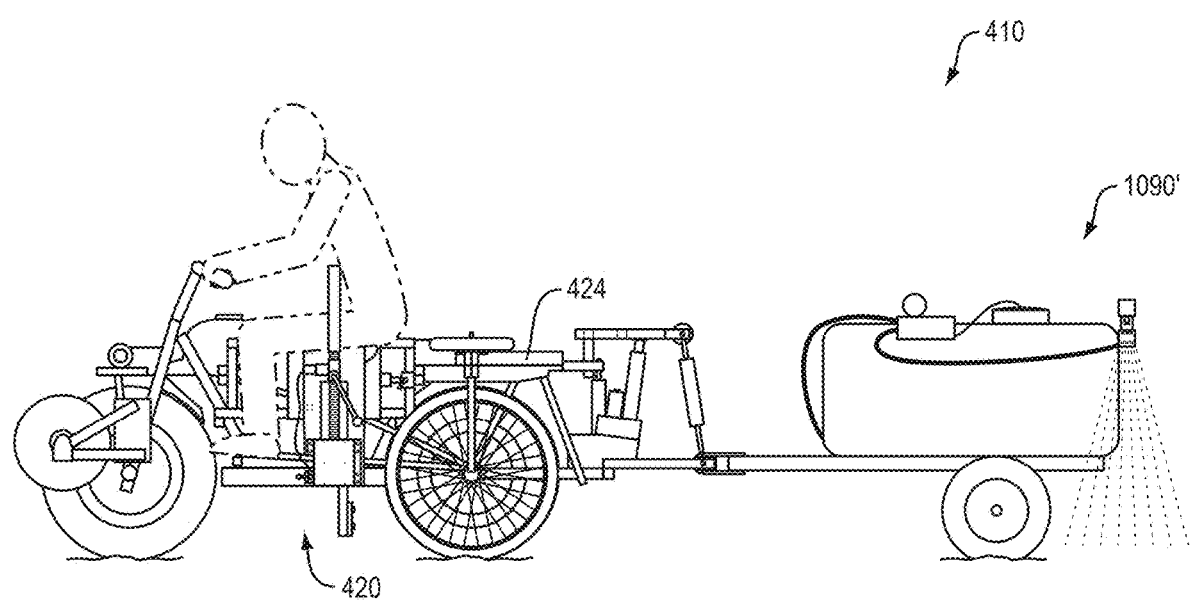
FIG. 8H is a rear perspective view of one exemplary embodiment of a sprayer located on the vehicle of FIG. 6A.

FIG. 8G illustrates a trailer 1190 mounted to the ball tow hitch 497 of the vehicle 410 of FIGS. 6A-6C. The trailer 1190 can be used to transport equipment or the like, and/or it can be used in conjunction with performing a farming operation, such as placing a sprayer in the trailer and operating the sprayer. An alternative method for operating a sprayer 1090' is shown in FIG. 8H. As shown, the sprayer 1090' is mounted onto the secondary seat 424 of the chassis 420 and operated. Other farming actions can be performed in a similar manner, such as providing a way to dispense seeds like a planter from the same location where the sprayer 1090' is illustrated in FIG. 8H.

The usage of a sprayer mounted at multiple locations with respect to the vehicle is illustrative of a broader principle that a number of the tools can be coupled or otherwise associated with the vehicle at multiple different locations. For example, similar to described above with respect to the hitches 497, 499, one or more of the tools can be coupled to or otherwise associated with the outrigger arm (e.g., the arm 470) and/or the third wheel (e.g., the wheel 460). Whether by way of a hitch(es) or another attachment mechanism known to those skilled in the art, tools such as sprayer and trailer, among others, can be dragged behind the third wheel or can serve in place of the third wheel such that the outrigger arm couples the tool to the chassis and/or the second wheel. To the extent the illustrated embodiments utilize on form of a hitch, other hitches, whether disclosed herein or otherwise known to those skilled in the art, can be used to associate a tool with a vehicle of the present disclosure.

A person skilled in the art will appreciate that although farming tools are the predominant operation discussed herein, the vehicles of the present disclosure can be adapted for other uses beyond farming. Thus, such vehicles can have two configurations—a transportation configuration and an operation configuration in which the operation is farming or some other action outside of farming. The vehicles provided for herein can be used more generally for hauling materials, i.e., transporting materials from one location to another, whether for farming or otherwise.

Non-limiting exemplary claims that are possible in view of the present disclosures are provided as follows, the claims including multiple dependencies to provide some non-limiting examples of ways features of the present disclosures can be combined:

1. A vehicle, comprising:
    a chassis having a length defined by a front-most end and a back-most end;
    a first wheel disposed below the chassis;
    a second wheel disposed behind the first wheel, the first wheel and the second wheel being vertically aligned along a longitudinal axis extending the length of the chassis;
    a third wheel disposed behind the first wheel, the third wheel being disposed offset from the longitudinal axis extending the length of the chassis;
    an outrigger arm disposed between and coupled to the third wheel and at least one of the chassis and the second wheel;
    a tool disposed behind the first wheel and in front of the second wheel, the tool being disposed offset from the longitudinal axis extending the length of the chassis and configured to be driven downwards by an active force, into ground over which the vehicle is traveling, such that the tool applies force to, and enters into, the ground; and
    a motor disposed behind the first wheel and configured to drive at least one of the first wheel and the second wheel.

2. The vehicle of claim 1, wherein the second wheel and the third wheel are axially aligned such that a center of the second wheel and a center of the third wheel are disposed along an alignment axis, the alignment axis being substantially perpendicular to the longitudinal axis extending the length of the chassis.

3. The vehicle of claim 1 or claim 2, the outrigger arm is manipulable to allow the third wheel to be stored on the vehicle such that the vehicle is driven with just the first wheel and the second wheel in contact with ground.

4. The vehicle of any of claims 1 to 3, wherein the outrigger arm has a storage position in which the third wheel is a distance above ground that is equivalent to at least a radius of the first wheel, each of the first wheel and the second wheel being in contact with the ground when the third wheel is in the storage position and the vehicle is being driven.

5. The vehicle of any of claims 1 to 4, wherein the motor is configured to drive both the first wheel and the second wheel.

6. The vehicle of any of claims 1 to 5, wherein the motor is configured to drive the third wheel.

7. The vehicle of any of claims 1 to 6, wherein the tool is further configured to apply a second active force to the vehicle to cause the vehicle to be pulled towards the ground while a position of the tool with respect to the ground remains substantially constant.

8. The vehicle of any of claims 1 to 7, wherein the applied force by the tool is a substantially horizontal force that cultivates the ground.

9. The vehicle of any of claims 1 to 8, wherein the tool is visible to an operator of the vehicle such that the operator is able to control operation of the tool based on visual observations of the tool.

10. The vehicle of any of claims 1 to 9, wherein the tool is movable laterally with respect to the longitudinal axis that extends the length of the chassis such that a distance between the tool and the chassis is adjustable while the vehicle and the tool are being operated.

11. The vehicle of any of claims 1 to 10, wherein the motor is configured to mechanically drive at least one of the first wheel and the second wheel.

12. The vehicle of any of claims 1 to 11, wherein the motor is configured to provide power take-off to the vehicle.

13. The vehicle of claim 12, further comprising:
   a front axle associated with the first wheel; and
   a rear axle associated with the second wheel,
   wherein the power take-off is located between the front axle and the rear axle, the power take-off being configured to rotate substantially perpendicularly to a centerline of the vehicle.

14. The vehicle of claim 12, further comprising:
   a rear axle associated with the second wheel,
   wherein the power take-off is located behind the rear axle, the power take-off being configured to be substantially parallel to a centerline of the vehicle.

15. The vehicle of any of claims 1 to 14, wherein the motor is configured to have a frequency of rotation held steady over a desired period of time.

16. The vehicle of claim 15,
   wherein the motor is configured to provide power take-off to the vehicle, and
   wherein a rotation speed of the power take-off is coupled to the frequency of rotation of the motor.

17. A vehicle, comprising:
   a chassis having a length defined by a front-most end and a back-most end;
   a first wheel disposed below the chassis;
   a second wheel disposed behind the first wheel, the first wheel and the second wheel being vertically aligned along a longitudinal axis extending the length of the chassis;
   a third wheel laterally offset from the longitudinal axis extending the length of the chassis, a center of the third wheel being disposed behind a center of the first wheel and one of in front of or axially aligned with a center of the second wheel from a side view of the vehicle;
   an outrigger arm disposed between and coupled to the third wheel and at least one of the chassis and the second wheel;
   a tool for performing a farming operation coupled to at least one of the chassis and the outrigger arm; and
   a motor disposed behind the first wheel and configured to drive at least one of the first wheel and the second wheel.

18. The vehicle of claim 17, wherein the second wheel and the third wheel are axially aligned such that the center of the second wheel and the center of the third wheel are disposed along an alignment axis, the alignment axis being substantially perpendicular to the longitudinal axis extending the length of the chassis.

19. The vehicle of claim 17 or claim 18, wherein the outrigger arm is manipulable to allow the third wheel to be stored on the vehicle such that the vehicle is driven with just the first wheel and the second wheel in contact with ground.

20. The vehicle of any of claims 17 to 19, wherein the outrigger arm has a storage position in which the third wheel is a distance above ground that is equivalent to at least a radius of the first wheel, each of the first wheel and the second wheel being in contact with the ground when the third wheel is in the storage position and the vehicle is being driven.

21. The vehicle of any of claims 17 to 20, wherein the motor is configured to drive both the first wheel and the second wheel.

22. The vehicle of any of claims 17 to 21, wherein the motor is configured to drive the third wheel.

23. The vehicle of any of claims 17 to 22, wherein the tool is disposed behind the first wheel and in front of the second wheel, the tool being disposed offset from the longitudinal axis extending the length of the chassis.

24. The vehicle of any of claims 17 to 22, wherein the tool is disposed behind the second wheel.

25. The vehicle of any of claims 17 to 24, wherein the tool is configured to be driven downwards by an active force, into ground over which the vehicle is traveling, such that the tool applies force to, and enters into, the ground.

26. The vehicle of claim 25, wherein the tool is further configured to apply a second active force to the vehicle to cause the vehicle to be pulled towards the ground while a position of the tool with respect to the ground remains substantially constant.

27. The vehicle of claim 25 or claim 26, wherein the applied force by the tool is a substantially horizontal force that cultivates the ground.

28. The vehicle of any of claims 17 to 23, wherein the tool is visible to an operator of the vehicle such that the operator is able to control operation of the tool based on visual observations of the tool.

29. The vehicle of any of claims 17 to 28, wherein the tool is movable laterally with respect to the longitudinal axis that extends the length of the chassis such that a distance between the tool and the chassis is adjustable while the vehicle is being operated to perform a farming operation.

30. The vehicle of any of claims 17 to 29, wherein the motor is configured to mechanically drive at least one of the first wheel and the second wheel.

31. The vehicle of any of claims 17 to 30, wherein the motor is configured to provide power take-off to the vehicle.

32. The vehicle of claim 31, further comprising:
   a front axle associated with the first wheel; and
   a rear axle associated with the second wheel,
   wherein the power take-off is located between the front axle and the rear axle, the power take-off being configured to rotate substantially perpendicularly to a centerline of the vehicle.

33. The vehicle of claim 31, further comprising:
   a rear axle associated with the second wheel,
   wherein the power take-off is located behind the rear axle, the power take-off being configured to be substantially parallel to a centerline of the vehicle.

34. The vehicle of any of claims 17 to 33, wherein the motor is configured to have a frequency of rotation held steady over a desired period of time.

35. The vehicle of claim 34,
   wherein the motor is configured to provide power take-off to the vehicle, and
   wherein a rotation speed of the power take-off is coupled to the frequency of rotation of the motor.

36. A vehicle, comprising:
   a chassis having a length defined by a front-most end and a back-most end;
   a first wheel disposed below the chassis;

a second wheel disposed behind the first wheel, the first wheel and the second wheel being vertically aligned along a longitudinal axis extending the length of the chassis;

a third wheel disposed behind the first wheel, the third wheel being disposed offset from the longitudinal axis extending the length of the chassis;

an outrigger arm disposed between and coupled to the third wheel and at least one of the chassis and the second wheel;

a cultivation tool disposed behind the first wheel and in front of the second wheel, the tool being disposed offset from the longitudinal axis extending the length of the chassis, at a location closer to the longitudinal axis than the third wheel is located with respect to the longitudinal axis; and a motor disposed behind the first wheel and configured to power at least one of the first wheel and the second wheel.

37. The vehicle of claim 36, wherein the cultivation tool further comprises a tillage tool.

38. The vehicle of claim 36 or claim 37, wherein the cultivation tool is movable laterally with respect to the longitudinal axis that extends the length of the chassis such that a distance between the cultivation tool and the chassis is adjustable while the vehicle and the cultivation tool are being operated.

39. The vehicle of any of claims 36 to 38, wherein the second wheel and the third wheel are axially aligned such that a center of the second wheel and a center of the third wheel are disposed along an alignment axis, the alignment axis being substantially perpendicular to the longitudinal axis extending the length of the chassis.

40. The vehicle of any of claims 36 to 39, wherein the outrigger arm is manipulable to allow the third wheel to be stored on the vehicle such that the vehicle is driven with just the first wheel and the second wheel in contact with ground.

41. The vehicle of any of claims 36 to 40, wherein the outrigger arm has a storage position in which the third wheel is a distance above ground that is equivalent to at least a radius of the first wheel, each of the first wheel and the second wheel being in contact with the ground when the third wheel is in the storage position and the vehicle is being driven.

42. The vehicle of any of claims 36 to 41, wherein the motor is configured to drive both the first wheel and the second wheel.

43. The vehicle of any of claims 36 to 42, wherein the motor is configured to drive the third wheel.

44. The vehicle of any of claims 36 to 43, wherein the cultivation tool is configured to be driven downwards by an active force, into ground over which the vehicle is traveling, such that the cultivation tool applies force to, and enters into, the ground.

45. The vehicle of claim 44, wherein the cultivation tool is further configured to apply a second active force to the vehicle to cause the vehicle to be pulled towards the ground while a position of the cultivation tool with respect to the ground remains substantially constant.

46. The vehicle of any of claims 36 to 45, wherein the cultivation tool is visible to an operator of the vehicle such that the operator is able to control operation of the cultivation tool based on visual observations of the cultivation tool.

47. The vehicle of any of claims 36 to 46, wherein the motor is configured to mechanically drive at least one of the first wheel and the second wheel.

48. The vehicle of any of claims 36 to 47, wherein the motor is configured to provide power take-off to the vehicle.

49. The vehicle of claim 48, further comprising:
a front axle associated with the first wheel; and
a rear axle associated with the second wheel,
wherein the power take-off is located between the front axle and the rear axle, the power take-off being configured to rotate substantially perpendicularly to a centerline of the vehicle.

50. The vehicle of claim 48, further comprising:
a rear axle associated with the second wheel,
wherein the power take-off is located behind the rear axle, the power take-off being configured to be substantially parallel to a centerline of the vehicle.

51. The vehicle of any of claims 36 to 50, wherein the motor is configured to have a frequency of rotation held steady over a desired period of time.

52. The vehicle of claim 51,
wherein the motor is configured to provide power take-off to the vehicle, and
wherein a rotation speed of the power take-off is coupled to the frequency of rotation of the motor.

One skilled in the art will appreciate further features and advantages of the disclosure based on the above-described embodiments. Accordingly, the disclosure is not to be limited by what has been particularly shown and described, except as indicated by the appended claims. All publications and references cited herein are expressly incorporated herein by reference in their entirety.

What is claimed is:

1. A vehicle, comprising:
a chassis having a length defined by a front-most end and a back-most end;
a first wheel disposed below the chassis;
a second wheel disposed behind the first wheel, the first wheel and the second wheel being vertically aligned along a longitudinal axis extending the length of the chassis;
a third wheel disposed behind the first wheel, the third wheel being disposed offset from the longitudinal axis extending the length of the chassis;
an outrigger arm disposed between and coupled to the third wheel and at least one of the chassis and the second wheel;
a tool disposed behind the first wheel and in front of the second wheel, the tool being disposed offset from the longitudinal axis extending the length of the chassis and configured to be driven downwards by at least one of a direct supply of an active force or an indirect supply of an active force, into ground over which the vehicle is traveling, such that the tool applies force to, and enters into, the ground; and
a motor disposed behind the first wheel and configured to drive at least one of the first wheel and the second wheel.

2. The vehicle of claim 1, wherein the second wheel and the third wheel are axially aligned such that a center of the second wheel and a center of the third wheel are disposed along an alignment axis, the alignment axis being substantially perpendicular to the longitudinal axis extending the length of the chassis.

3. The vehicle of claim 1, the outrigger arm is manipulable to allow the third wheel to be stored on the vehicle such that the vehicle is driven with just the first wheel and the second wheel in contact with ground.

4. The vehicle of claim 1, wherein the outrigger arm has a storage position in which the third wheel is a distance above ground that is equivalent to at least a radius of the first wheel, each of the first wheel and the second wheel being in contact with the ground when the third wheel is in the storage position and the vehicle is being driven.

5. The vehicle of claim 1, wherein the motor is configured to drive both the first wheel and the second wheel.

6. The vehicle of claim 1, wherein the tool is further configured to apply a second active force to the vehicle to cause the vehicle to be pulled towards the ground while a position of the tool with respect to the ground remains substantially constant.

7. The vehicle of claim 1, wherein the applied force by the tool is a substantially horizontal force that cultivates the ground.

8. The vehicle of claim 1, wherein the tool is visible to an operator of the vehicle such that the operator is able to control operation of the tool based on visual observations of the tool.

9. The vehicle of claim 1, wherein the tool is movable laterally with respect to the longitudinal axis that extends the length of the chassis such that a distance between the tool and the chassis is adjustable while the vehicle and the tool are being operated.

10. The vehicle of claim 1, wherein the motor is configured to provide power take-off to the vehicle, the vehicle further comprising:
a front axle associated with the first wheel; and
a rear axle associated with the second wheel,
wherein the power take-off is located between the front axle and the rear axle, the power take-off being configured to rotate substantially perpendicularly to a centerline of the vehicle.

11. The vehicle of claim 1, wherein the motor is configured to provide power take-off to the vehicle, the vehicle further comprising:
a rear axle associated with the second wheel,
wherein the power take-off is located behind the rear axle, the power take-off being configured to be substantially parallel to a centerline of the vehicle.

12. The vehicle of claim 1, wherein the motor is configured to have a frequency of rotation held steady over a desired period of time.

13. The vehicle of claim 1,
wherein the direct supply of the active force comprises at least one of an operator turning a knob or rotating a crank to cause the tool to apply force to, and enter into, the ground, and
wherein the indirect supply of the active force comprises an operator pushing a button that causes the motor to cause the tool to apply force to, and enter into, the ground.

14. A vehicle, comprising:
a chassis having a length defined by a front-most end and a back-most end;
a first wheel disposed below the chassis;
a second wheel disposed behind the first wheel, the first wheel and the second wheel being vertically aligned along a longitudinal axis extending the length of the chassis;
a third wheel laterally offset from the longitudinal axis extending the length of the chassis, a center of the third wheel being disposed behind a center of the first wheel and one of in front of or axially aligned with a center of the second wheel from a side view of the vehicle;
an outrigger arm disposed between and coupled to the third wheel and at least one of the chassis and the second wheel;
a tool for performing a farming operation coupled to at least one of the chassis and the outrigger arm; and
a motor disposed behind the first wheel and configured to drive at least one of the first wheel and the second wheel,
wherein the third wheel is configured to be stored at least one of on the vehicle above the chassis or disposed substantially behind the second wheel.

15. The vehicle of claim 14, wherein the outrigger arm is configured to be disposed on a same side of the chassis as the tool or on an opposite side of the chassis as the tool.

16. The vehicle of claim 14, wherein the outrigger arm has a storage position in which the third wheel is a distance above ground that is equivalent to at least a radius of the first wheel, each of the first wheel and the second wheel being in contact with the ground when the third wheel is in the storage position and the vehicle is being driven.

17. The vehicle of claim 14, wherein the motor is configured to drive the third wheel.

18. The vehicle of claim 14, wherein the tool is disposed behind the second wheel.

19. The vehicle of claim 14, wherein the tool is configured to be driven downwards by an active force, into ground over which the vehicle is traveling, such that the tool applies force to, and enters into, the ground, and to apply a second active force to the vehicle to cause the vehicle to be pulled towards the ground while a position of the tool with respect to the ground remains substantially constant.

20. The vehicle of claim 14, wherein the tool is visible to an operator of the vehicle such that the operator is able to control operation of the tool based on visual observations of the tool.

21. The vehicle of claim 14, wherein the motor is configured to provide power take-off to the vehicle, the vehicle further comprising:
a front axle associated with the first wheel; and
a rear axle associated with the second wheel,
wherein the power take-off is located between the front axle and the rear axle, the power take-off being configured to rotate substantially perpendicularly to a centerline of the vehicle.

22. A vehicle, comprising:
a chassis having a length defined by a front-most end and a back-most end;
a first wheel disposed below the chassis;
a second wheel disposed behind the first wheel, the first wheel and the second wheel being vertically aligned along a longitudinal axis extending the length of the chassis;
a third wheel disposed behind the first wheel, the third wheel being disposed offset from the longitudinal axis extending the length of the chassis;
an outrigger arm disposed between and coupled to the third wheel and at least one of the chassis and the second wheel;
a cultivation tool disposed behind the first wheel and in front of the second wheel, the tool being disposed offset from the longitudinal axis extending the length of the chassis, at a location closer to the longitudinal axis than the third wheel is located with respect to the longitudinal axis, the cultivation tool being disposed offset from the longitudinal axis extending the length of the chassis and movable laterally with respect to the longitudinal axis such that a distance between the cultivation tool and the chassis is adjustable while the vehicle and the cultivation tool are being operated; and a motor disposed behind the first wheel and configured to power at least one of the first wheel and the second wheel.

23. The vehicle of claim 22, wherein the cultivation tool further comprises a tillage tool.

24. The vehicle of claim 22, wherein the second wheel and the third wheel are axially aligned such that a center of the second wheel and a center of the third wheel are disposed along an alignment axis, the alignment axis being substantially perpendicular to the longitudinal axis extending the length of the chassis.

25. The vehicle of claim 22, wherein the outrigger arm has a storage position in which the third wheel is a distance above ground that is equivalent to at least a radius of the first wheel, each of the first wheel and the second wheel being in contact with the ground when the third wheel is in the storage position and the vehicle is being driven.

26. The vehicle of claim 22, wherein the motor is configured to drive the third wheel.

27. The vehicle of claim 22, wherein the cultivation tool is visible to an operator of the vehicle such that the operator is able to control operation of the cultivation tool based on visual observations of the cultivation tool.

28. The vehicle of claim 22, wherein the motor is configured to provide power take-off to the vehicle.

* * * * *